(12) United States Patent
Jensen et al.

(10) Patent No.: US 11,843,402 B1
(45) Date of Patent: Dec. 12, 2023

(54) INTEGRATED SIGNAL CHAIN FOR AN ANTENNA ASSEMBLY

(71) Applicant: Space Exploration Technologies Corp., Hawthorne, CA (US)

(72) Inventors: Anders Jensen, Beaux Arts, WA (US); Samuel T. Reineman, Kirkland, WA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 7 days.

(21) Appl. No.: 17/826,033

(22) Filed: May 26, 2022

Related U.S. Application Data

(60) Provisional application No. 63/197,377, filed on Jun. 5, 2021, provisional application No. 63/194,996, filed on May 29, 2021.

(51) Int. Cl.
| | | |
|---|---|---|
| *H04B 1/04* | (2006.01) | |
| *H04B 1/18* | (2006.01) | |
| *H01P 3/12* | (2006.01) | |
| *H04B 1/036* | (2006.01) | |
| *H04B 7/185* | (2006.01) | |

(52) U.S. Cl.
CPC ............. *H04B 1/0458* (2013.01); *H01P 3/12* (2013.01); *H04B 1/036* (2013.01); *H04B 1/18* (2013.01); *H04B 7/18515* (2013.01)

(58) Field of Classification Search
CPC ........ H04B 1/0458; H04B 1/036; H04B 1/18; H04B 7/18515; H01P 3/12
See application file for complete search history.

(56) References Cited

U.S. PATENT DOCUMENTS

| | | | |
|---|---|---|---|
| 2010/0285758 A1* | 11/2010 | Laidig | H01P 1/161 |
| | | | 343/702 |
| 2017/0336503 A1* | 11/2017 | Hammerschmidt | H01P 3/12 |
| 2018/0375214 A1* | 12/2018 | Runyon | H01Q 5/55 |

* cited by examiner

*Primary Examiner* — Nguyen T Vo
(74) *Attorney, Agent, or Firm* — Polsinelli PC

(57) ABSTRACT

An integrated signal chain includes a waveguide network defined by first and second waveguide layers forming a waveguide stack. A first transmit waveguide channel (WGC) is configured to communicate first transmit electromagnetic signals from a first transmit port to an antenna feed port, and a first receive WGC is configured to communicate first receive electromagnetic signals from the antenna feed port to a first receive port. A transmit module is attached to an exterior side of the first waveguide layer, and the first transmit WGC couples the transmit module to the antenna. A receive module is attached to the exterior side of the first waveguide layer, and the first receive WGC couples the antenna to the receive module. A modem may be included. A thermal management assembly can be configured to dissipate heat from the modem, the receive module, and/or the transmit module.

20 Claims, 16 Drawing Sheets

INTEGRATED SIGNAL CHAIN FOR AN ANTENNA ASSEMBLY

CROSS-REFERENCE TO RELATED APPLICATIONS

This application claims priority to U.S. Provisional Application No. 63/197,377, filed on Jun. 5, 2021, entitled "INTEGRATED SIGNAL CHAIN FOR AN ANTENNA ASSEMBLY", and U.S. Provisional Application No. 63/194,996, filed on May 29, 2021, entitled "INTEGRATED SIGNAL CHAIN FOR AN ANTENNA ASSEMBLY", the contents of which are incorporated herein in their entirety and for all purposes.

TECHNICAL FIELD

The present technology pertains generally to an integrated signal chain for an antenna assembly that may include a transmit module, a receive module, a modem assembly, and a planar waveguide network, wherein the transmit module and the receive module are mounted directly to the waveguide network.

BACKGROUND

In satellite communication systems, a satellite will transmit signals to a ground station, or a gateway or terrestrial gateway on the Earth. The gateway is configured to convert a Radio Frequency (RF) signal received from the satellite to an Internet Protocol (IP) signal for terrestrial connectivity with a local area network (such as the Internet). The gateway transmits data to the local area network and receives data from the local area network for transmission back to the satellite.

The satellite and the gateway each transmit and receive signals via a respective satellite antenna and a gateway antenna. The antenna components may include a transmit module(s) (or transmitter(s)) to generate signals for transmission, a receive module(s) (or receiver(s)) to process signals received, and waveguides to connect the transmit module(s) and receive module(s) to the antenna. A waveguide is a hollow metal structure used to carry radio waves. Waveguides are built into the system to communicate signals received at the antenna to the receive module(s) or to communicate signals generated by the transmit module(s) to the antenna for transmission to the satellite.

The electromagnetic waves transmitted through waveguides travel down the waveguide in a zig-zag path, being repeatedly reflected between opposite walls of the waveguide. For the particular case of a rectangular waveguide, it is possible to base an exact analysis on such a zig-zag path. The physical configuration of waveguides that pass electromagnetic signals between transmit/receive components and an antenna is therefore important. For example, high frequency signals are passed through waveguides that have a small dimension (such as a millimeter in width) for extremely high frequency communications. Lower frequencies electromagnetic signals are physically larger in size and require waveguides with much larger dimensions.

Typical antenna systems use discrete, commercial off-the-shelf receive modules, transmit modules, waveguides, and other components (heat sinks, fans, electrical connections, etc.) to define a signal path or "chain" for the antenna. Using all of these discrete components results in a signal chain having a large number of parts that is therefore expensive, complicated to assemble, install, and service, and large in overall size. Accordingly, there is a need for an improved signal chain for an antenna assembly.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An integrated signal chain includes a waveguide network defined by a first waveguide layer combined with a second waveguide layer forming a waveguide stack, the waveguide network including a first transmit waveguide channel (transmit WGC) configured to communicate first transmit electromagnetic signals associated with an antenna from a first transmit port to an antenna feed port, and a first receive waveguide channel (receive WGC) configured to communicate first receive electromagnetic signals associated with the antenna from the antenna feed port to a first receive port. A communication assembly includes a modem, a transmit module attached to the exterior side of the first waveguide layer, wherein the first transmit WGC couples the transmit module to the antenna, and a receive module attached to the exterior side of the first waveguide layer, wherein the first receive WGC couples the antenna to the receive module. A thermal management assembly is configured to for airflow in an airflow path to dissipate heat from one or more components of the communication assembly In one aspect, the antenna feed port to the waveguide network is located at or near a first end of the waveguide stack, the first transmit port is located at or near a second end of the waveguide stack, and the first receive port is located at or near a central region of the waveguide stack.

An integrated signal chain may be formed by operations including assembling a transmit module by securing a transmit heat sink to a transmit module circuit board, assembling a receive module by securing a receive heat sink to a receive module circuit board, combining a first waveguide layer and a second waveguide layer to form a waveguide stack defining a waveguide network including a first transmit waveguide channel (transmit WGC) configured to communicate first transmit electromagnetic signals associated with an antenna from a first transmit port to an antenna feed, and a first receive waveguide channel (receive WGC) configured to communicate first receive electromagnetic signals associated with the antenna from the antenna feed port to a first receive port, wherein the antenna feed port to the waveguide network is located at or near a first end of the waveguide stack, the first transmit port is located at or near a second end of the waveguide stack, and the first receive port is located at or near a central region of the waveguide stack, attaching the transmit module to an exterior surface of the first waveguide layer near the second end of the waveguide stack, and attaching the receive module to the exterior surface of the first waveguide layer near the first end of the waveguide stack, wherein the first transmit WGC couples the transmit module to the antenna and wherein the first receive WGC couples the antenna to the receive module.

BRIEF DESCRIPTION OF THE DRAWINGS

In order to describe the manner in which the above-recited issues can be addressed, a more particular description of the principles briefly described above will be rendered by reference to specific embodiments thereof that are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
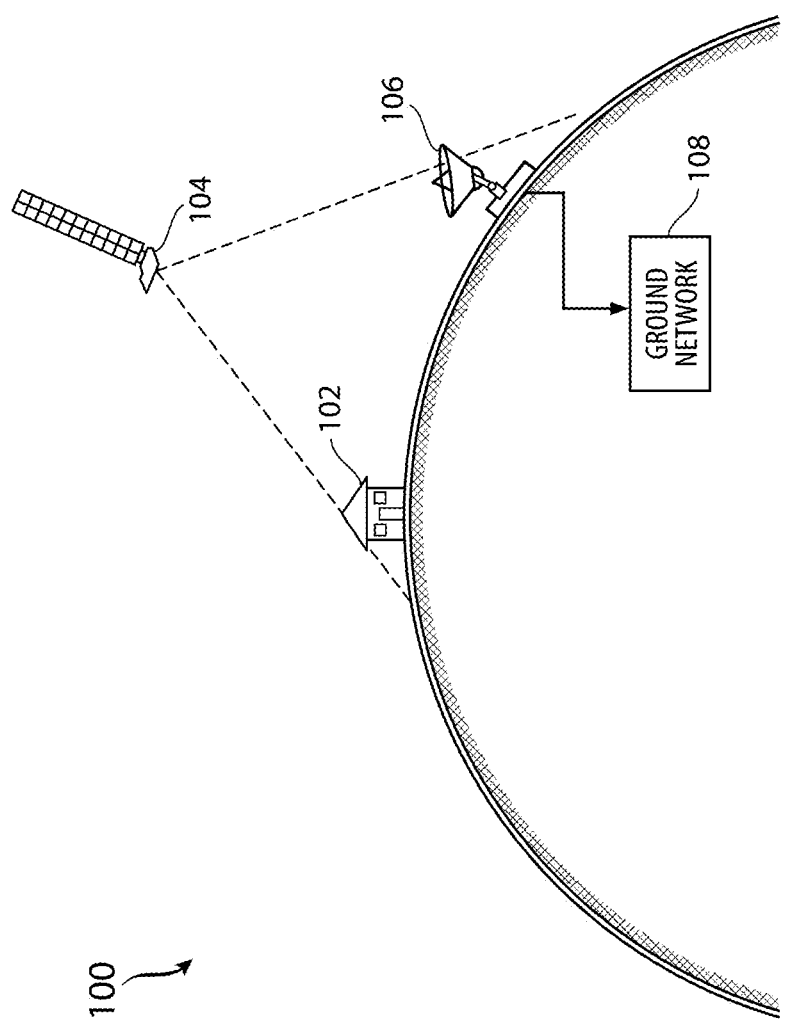
FIG. 1 is a not-to-scale schematic view of an example of a satellite communication system.

Various example embodiments of the disclosure are discussed in detail below. While specific implementations are discussed, it should be understood that this description is for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the example embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative example embodiments mutually exclusive of other example embodiments. Moreover, various features are described which may be exhibited by some example embodiments and not by others. Any feature of one example can be integrated with or used with any other feature of any other example.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various example embodiments given in this specification.

Without intent to limit the scope of the disclosure, examples of instruments, apparatus, methods and their related results according to the example embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

For clarity of explanation, in some instances the present technology may be presented as including individual functional blocks representing devices, device components, steps or routines in a method embodied in software, or combinations of hardware and software.

Terms such as "coupled," "mounted," "attached," and the like should be understood to include both direct coupling, mounting, or attaching, as well as indirect coupling, mounting, or attaching through one or more intermediate components or features, unless otherwise modified by use of a term such as "directly" in connection with the coupling, mounting, or attaching.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

Systems are currently being deployed to provide communication via constellations of satellites. FIG. 1 is a not-to-scale schematic diagram that illustrates an example of communication in such a satellite system 100. An endpoint terminal or user terminal 102 is installed at a house, a business, a vehicle, or another location where it is desired to obtain communication access via a network of satellites. A communication path is established between the endpoint terminal 102 and a satellite 104. The satellite 104, in turn, establishes a communication path with a gateway terminal 106. In another embodiment, the satellite 104 may establish a communication path with another satellite (not shown) prior to communication with a gateway terminal 106. The gateway terminal 106 is physically connected via fiber optic, Ethernet, or another physical or wireless connection to a ground network 108. The ground network 108 may be any type of network, including the Internet.

Exemplary embodiments of the present disclosure are directed to an integrated signal chain that can be implemented in a gateway antenna system on Earth. Although the integrated signal chain is described and shown herein for a gateway antenna system, it should be appreciated the integrated signal chain can also be useful for satellites that communicate with the gateway system, endpoint terminals that communicate with the satellites, or any other antenna system. Moreover, the integrated signal chain is described and shown herein for a particular type of parabolic antenna assembly that includes a dual-reflector configuration, for example, including a parabolic reflector and a feed system including a sub-reflector. However, embodiments of the present disclosure may be applied to antenna assemblies having other suitable configurations.

Figure 2A:
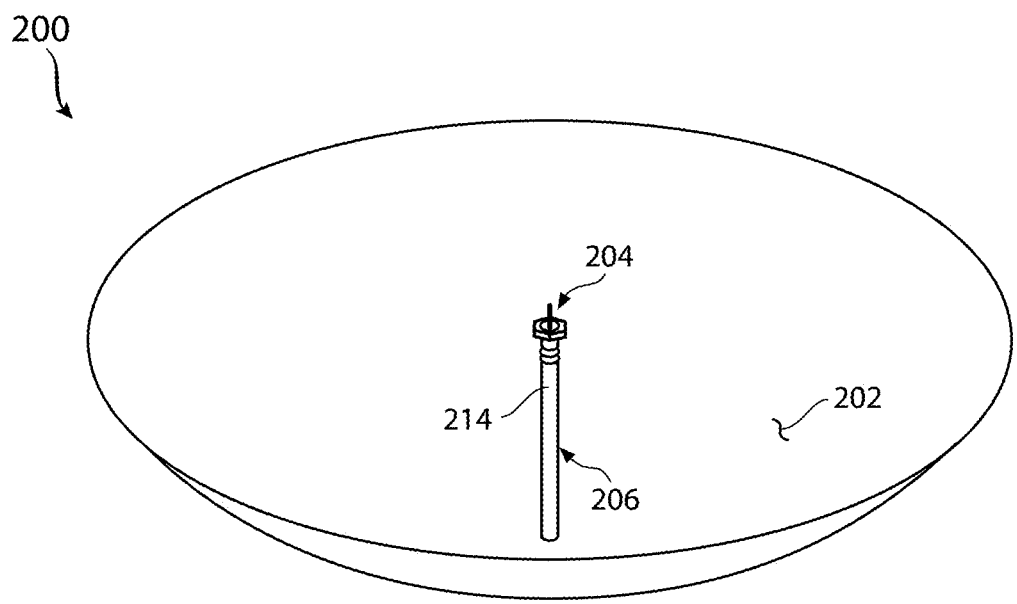
FIG. 2A is an isometric view of an antenna assembly in accordance with embodiments of the present disclosure.
Figure 2B:
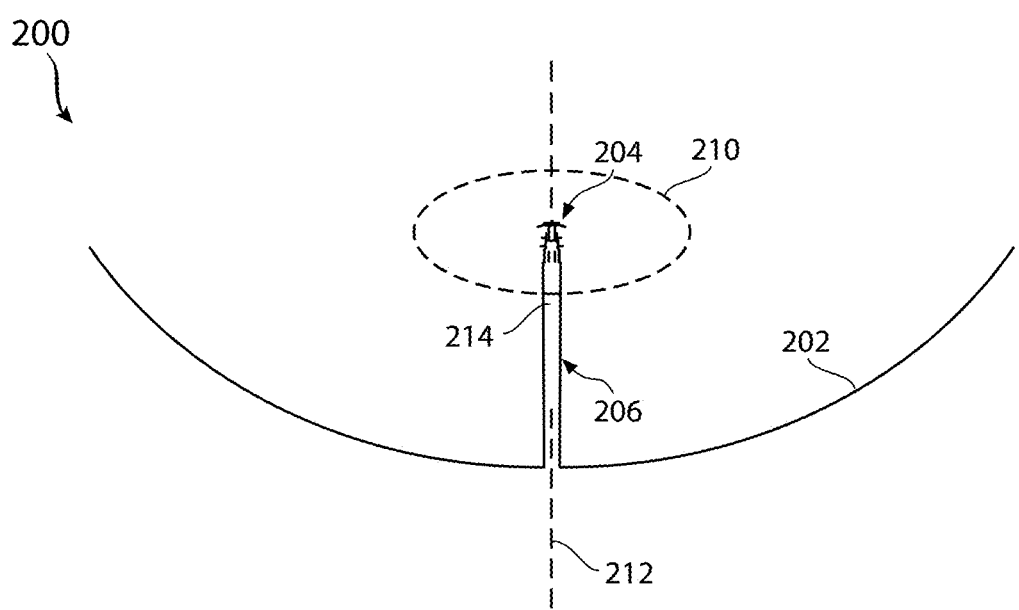
FIG. 2B is a side view of the antenna assembly of FIG. 2A, wherein a parabolic reflector of the antenna assembly is shown in cross-section.

FIGS. 2A and 2B are schematic drawings illustrating an exemplary dual-reflector parabolic antenna assembly 200 including a main parabolic reflector 202 and a feed system 206 including a secondary sub-reflector 204. Such an antenna assembly 200 can be called a dual-reflector or Cassegrain antenna. The "dual" or two reflectors in the antenna assembly 200 include the main or first parabolic reflector 202 and the secondary smaller sub-reflector 204. The feed system 206 is mounted at or near the surface of the concave parabolic reflector 202 and is in direct radio communication with the smaller secondary sub-reflector 204 located in front of the parabolic reflector 202.

The parabolic reflector 202 may be designed to have a specific shape for desired communication. For example, different parabolic reflector shapes include a dish shaped like a paraboloid truncated in a circular rim, a shrouded dish, a cylindrical design curved in one direction and flat in the other, and other shaped reflectors. The parabolic reflector 202 can be made from a metal, a carbon composite, or any other suitable material.

The feed system 206 includes the sub-reflector 204 and a horn 214, wherein the horn 214 is used to communicate signals to and from the sub-reflector 204. The radiation pattern of the feed system 206 is tailored to the shape of the parabolic reflector 202 for aperture efficiency, which determines antenna gain. The presence of the sub-reflector 204 as a secondary reflecting surface in the signal path allows additional tailoring of the radiation pattern for maximum performance. For example, in "dual reflector shaping" the shape of the sub-reflector 204 is altered to direct more signal power to outer areas of the parabolic reflector 202, resulting in more uniform illumination of the parabolic reflector 202 to maximize the gain, increase the focal length of the antenna, and reduce sidelobes, among other advantages. As a non-limiting example, the sub-reflector 204 may be a hyperboloid, which may be contoured for desired radiation patterns.

Figure 3:
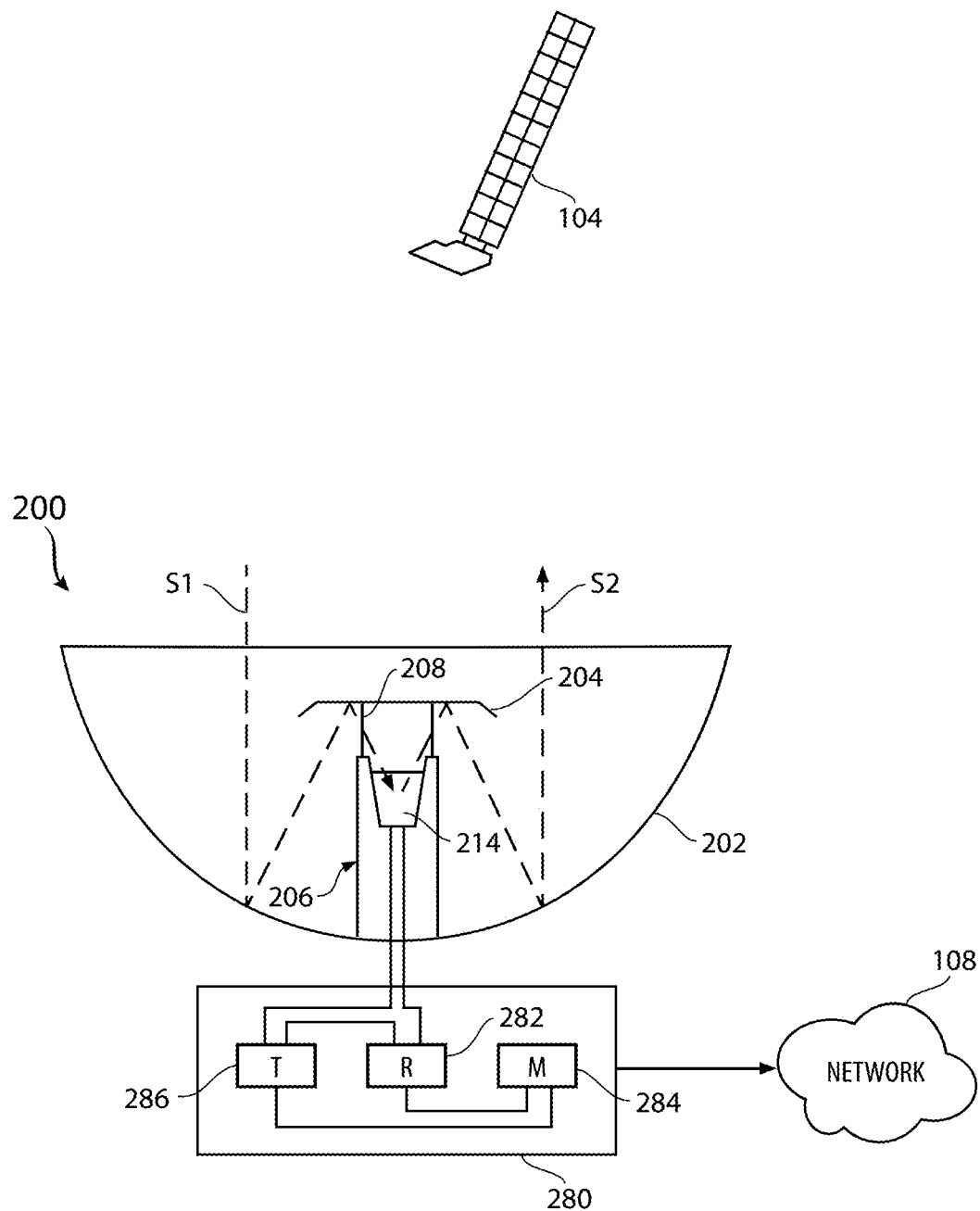
FIG. 3 is a schematic side view of an antenna assembly illustrating exemplary signal travel paths in accordance with embodiments of the present disclosure.

Referring to FIG. 3, signal travel paths in an exemplary dual reflector antenna assembly 200 will now be described. As seen in FIG. 3, satellite 104 can transmit a signal S1 to the antenna assembly 200. The received signal S1 can represent a data request, such as a request to return data from a uniform resource locator (URL) identifying a website a user desires to access, from the user's computer connected to the user terminal 102. The data request is communicated to the satellite 104, which forwards the request to the gateway 106. The satellite 104 transmits the data request in a signal S1 to the antenna assembly 200 which receives the signal S1.

The signal S1 reflects off of the parabolic reflector 202 and is directed to the sub-reflector 204. The sub-reflector 204 is configured to reflect the signal S1 to the horn 214. The horn 214 receives the signal S1 and communicates the signal S1 through a waveguide 280 to a receive module 282. The receive module 282 provides the signal S1 to a modem 284 that can convert the signal into appropriately formatted data (such as the Internet Protocol) for transmission to the ground network 108 (see FIG. 1), such as the Internet.

In response to the data request from the user, the ground network 108 can return data, for example, from a website. The data from the ground network 108 can be received at the modem 284, and converted from an Internet Protocol to a signal for transmission. Signals received from the ground network 108 can be sent via the modem 284 to a transmit module 286. A signal S2 generated by the transmit module 286 is passed through the waveguide 280 to the horn 214, then transmitted by the horn 214 to the sub-reflector 204. The sub-reflector 204 reflects the signal S2 to the parabolic reflector 202, which then reflects the signal S2 towards the satellite 104.

Figure 4:
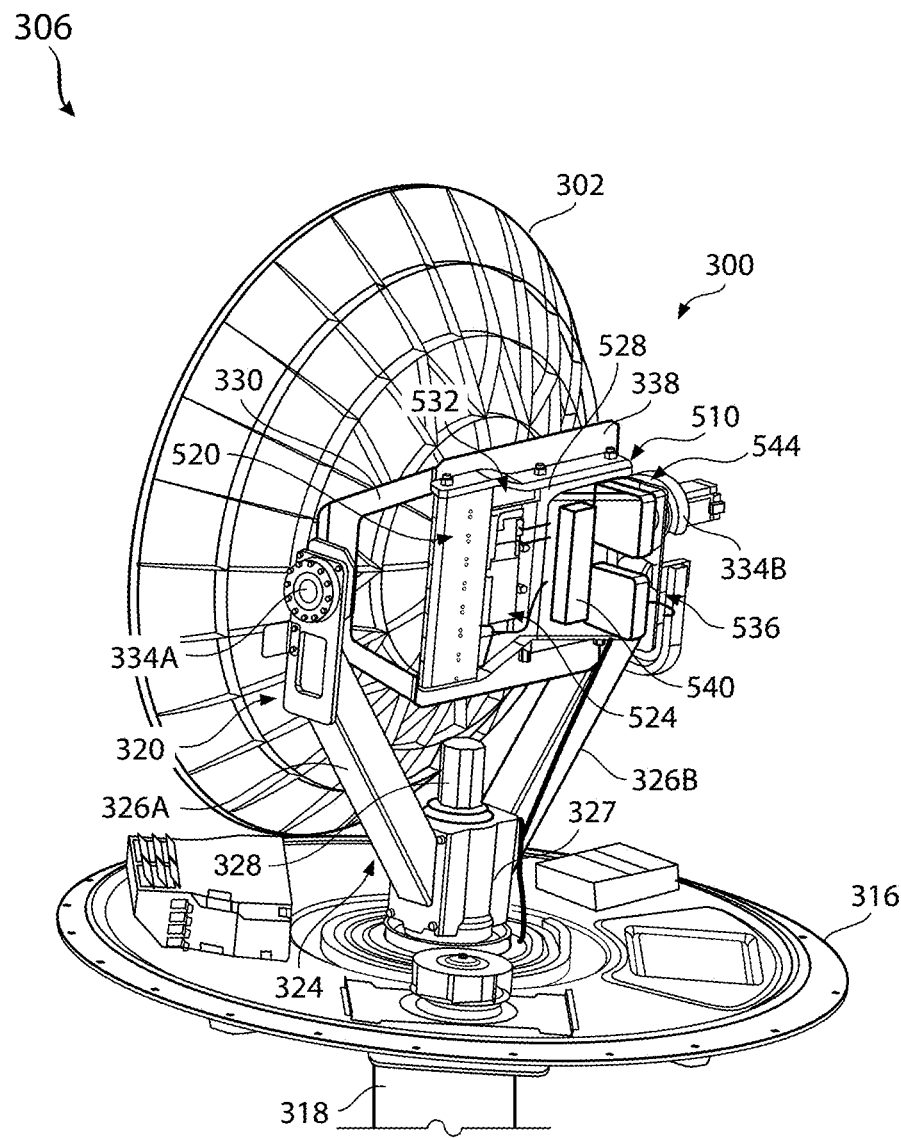
FIG. 4 is an isometric view of an exemplary gateway assembly having an integrated signal chain in accordance with embodiments of the present disclosure.
Figure 5:
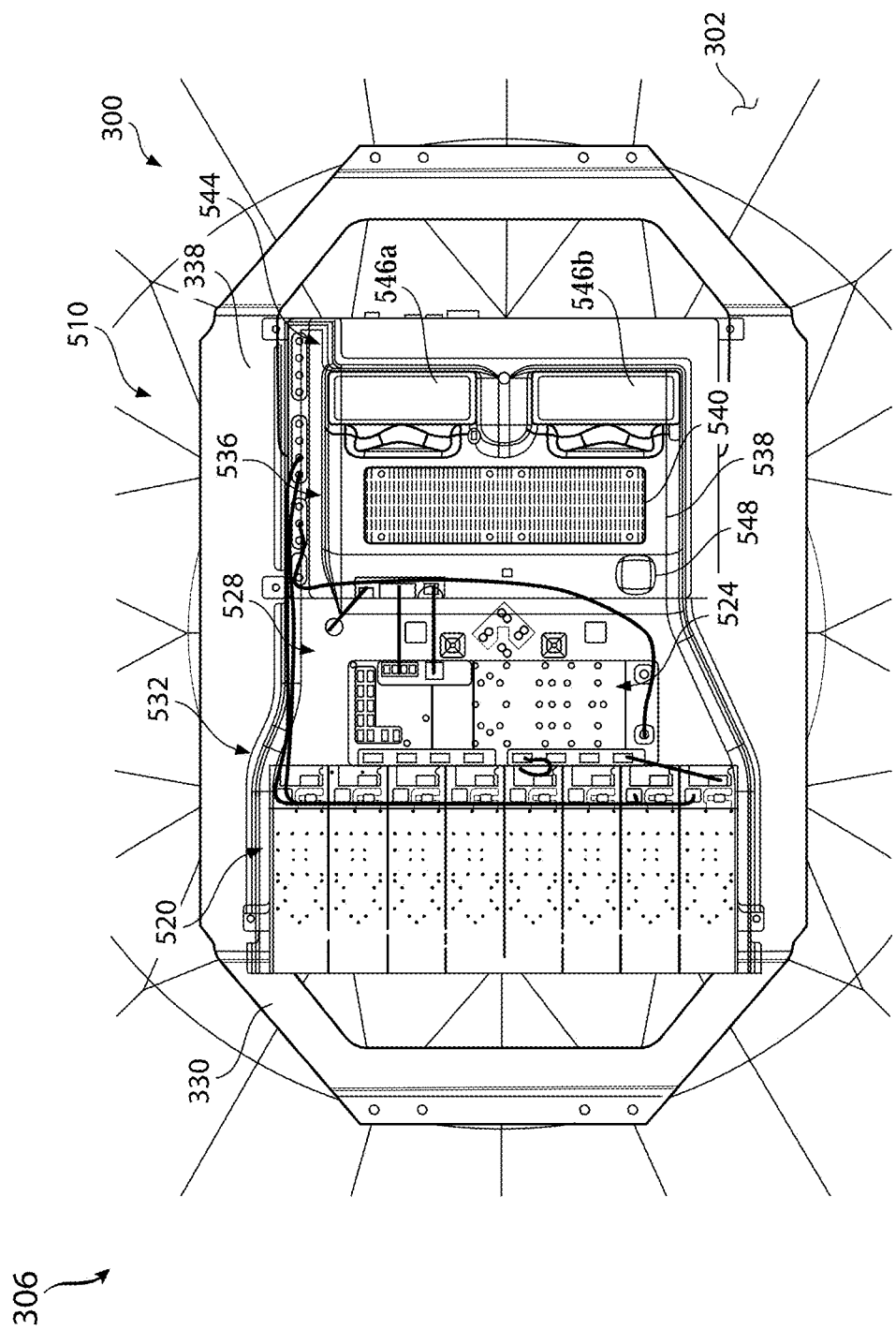
FIG. 5 is a top view of the integrated signal chain of FIG. 4 showing its various components including a transmit module, a receive module, a waveguide network, a GPS assembly, a modem assembly, and cooling components.

FIGS. 4 and 5 depict an exemplary gateway system 306 having an antenna assembly 300 with an integrated signal chain 510. The antenna assembly 300 is shown as a parabolic antenna similar to that described above with respect to FIGS. 2A, 2B, and 3. In that regard, the antenna assembly 300 includes a main parabolic reflector 302 and a secondary sub-reflector (not shown). The antenna assembly 300 is mounted within the gateway system 306 to optimally position the parabolic reflector 302 (and sub-reflector) for receiving and transmitting signals to another node on a network, such as one or more satellites.

In the depicted exemplary embodiment, the parabolic reflector 302 is mounted within the gateway system 306 through an antenna mounting assembly 320. The antenna mounting assembly 320 secures the parabolic reflector 302 relative to a base plate 316. The base plate 316, which is optionally secured to the upper end of a post 318, is configured to receive a cover (not shown) for enclosing and protecting the antenna assembly 300.

The antenna mounting assembly 320 includes a Y-frame 324 having first and second Y-frame members 326A and 326B. At a first end, the first and second Y-frame members 326A and 326B extend from a post mount 327 rotatably secured on a centered mounting post 328, which extends transversely from the base plate 316. The Y-frame 324 may pivot about an axis of the mounting post 328 to automatically or manually position the parabolic reflector 302 (and sub-reflector) at an optimal 360° position about the axis of the mounting post 328 for receiving and transmitting signals.

At a second end, the first and second Y-frame members 326A and 326B are secured to first and second ends of a bridge bracket 330, respectively. The bridge bracket 330 may be pivotally secured to the first and second Y-frame members 326A and 326B through first and second pivot mounts 334A and 334B. In this manner, the parabolic reflector 302 (and sub-reflector) may also be automatically or manually pivoted about the axis defined by the first and second pivot mounts 334A and 334B to further position the parabolic reflector 302 for receiving and transmitting signals.

The parabolic reflector 302 is secured to a first side of a mounting plate portion 338 of the bridge bracket 330. The integrated signal chain 510 is secured to the opposite, second side of the mounting plate portion 338 for processing the transmit and receive signals of the antenna assembly 300.

Figure 6A:
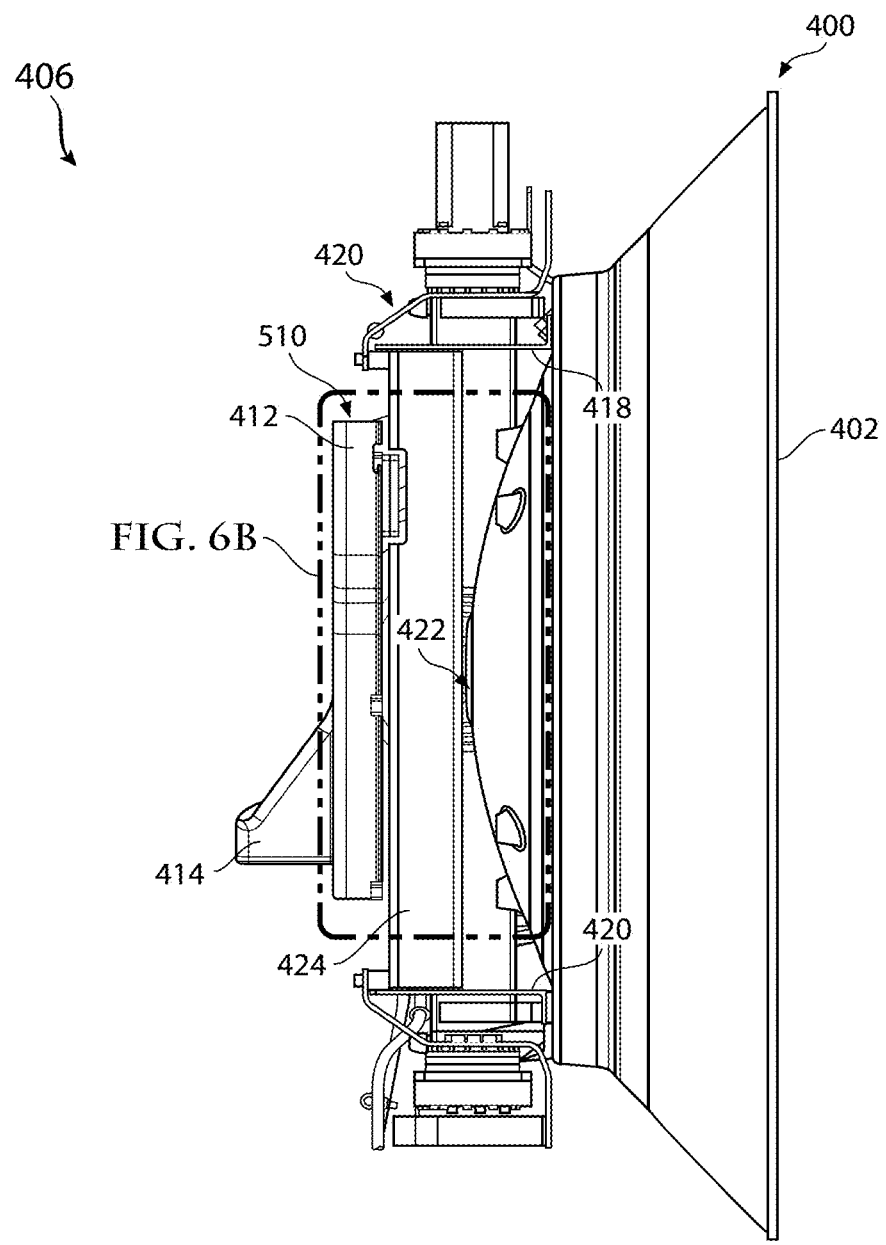
FIG. 6A is an exemplary antenna assembly having an integrated signal chain in accordance with embodiments of the present disclosure.
Figure 6B:
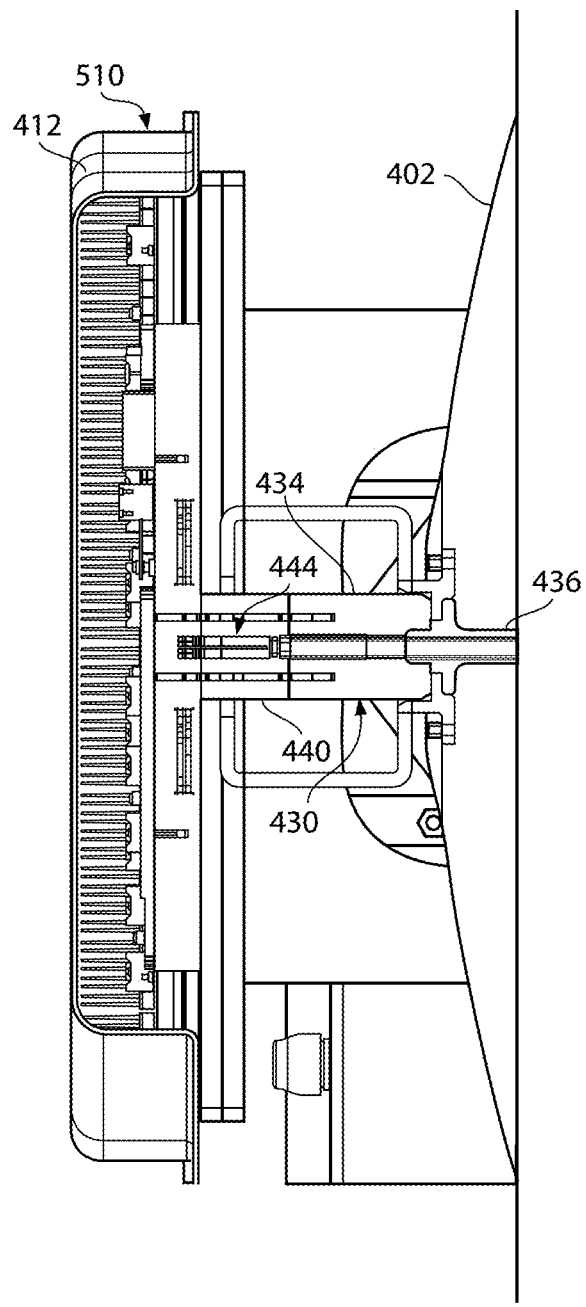
FIG. 6B is a cross-sectional view of the antenna assembly of FIG. 6A.

FIGS. 6A and 6B depict an alternate embodiment of a gateway system 406 having an antenna assembly 400 with the integrated signal chain 510, wherein the gateway system 406 uses an antenna mounting assembly 420, which is shown and described in U.S. Patent Application No. 63/194,120, filed May 27, 2021, hereby incorporated by reference in its entirety. The antenna mounting assembly 420 is shown in part to illustrate how the gateway system may use any suitable antenna mounting assembly.

In the embodiment depicted in FIGS. 6A and 6B, the parabolic reflector 402 is supported at least in part by a first flexure support 418 and a second flexure support 420. The first flexure support 418 and the second flexure support 420 are connected to a main structural beam 424 extending therebetween. A waveguide interface is generally positioned at a transition point 422 between the parabolic reflector 402 and the integrated signal chain 510. With the parabolic reflector 402 supported by the first flexure support 418 and the second flexure support 420, there is little or no axial constraint at the transition point 422.

FIGS. 6A and 6B also help illustrate exemplary structure of the waveguide interface between the parabolic reflector 402 and the integrated signal chain 510. The waveguide interface is depicted as a blind mate waveguide interface 430 having a first waveguide 434 interfacing with a second waveguide 436. The second waveguide 436 connects to and communicates with a feed assembly (not shown) of the parabolic reflector 402. The first and second waveguides 434 and 436 can be made from any materials used for waveguides such as metals like brass, copper, silver, aluminum, aluminum alloy, or metal alloys, or plastics or other material.

The first waveguide 434 interfaces with a polarizer waveguide structure 440, which houses a septum polarizer 444. The septum polarizer 444 is a linear-to-circular polarization converter that can be used to transition signals between the different polarizations for the parabolic reflector 402 and the integrated signal chain 510. Any structure can be used for the septum polarizer 444 to perform the linear-to-circular polarization transition.

Referring to FIGS. 4, 5, and 7-12, the integrated signal chain 510 will now be described. As noted briefly above, traditional gateway systems include various discrete transmit and receive modules that each require associated waveguide interfaces between the module and the feed system of the antenna. Often, when commercial off-the-shelf modules are used, expensive and complicated waveguide interconnects are needed to integrate the modules.

Integrating all of these discrete transmit and receive modules and associated waveguides is also technically difficult. The large number of discrete parts complicates the connections, packaging, cooling, and interfaces needed, and increases the overall footprint of the gateway system. Simply gaining access to a receive module, a transmit module, a waveguide interface, or any other components of the system (e.g., thermal management structures such as cooling fans and heat sinks, cabling, connectors, etc.) can be challenging. Moreover, the respective parts are typically very delicate, which can compromise the quality of installation, servicing, and replacement of the parts, leading to increased costs and decreased reliability.

Installing and servicing a respective component of a gateway system can also be difficult because intermediate frequency (IF) cables typically run through an energy chain or over an elevational (EL) axis of the system. Feeding the IF cables through the energy chains is cumbersome and does not sufficiently protect the IF cables from wear and tear. For instance, the modem is typically located below the EL axis of the gateway system, and the IF cables must run through an energy chain from the antenna receive/transmit components to the modem. Even though the IF cables are enclosed within an energy chain, the IF cables are sensitive to the wear and tear caused by the gimbaling of the gateway antenna.

In general, the integrated signal chain 510 is packaged in a substantially planar configuration to address at least the foregoing issues by providing a compact, simplified signal processing module for an antenna system. More particularly, the integrated signal chain 510 includes receive/transmit components, a waveguide network, a modem, and thermal management components which can be integrated into a single substantially planar assembly or line replaceable unit (LRU) that can be mounted to the back of a reflector or parabolic antenna. The integrated signal chain 510 also reduces the part count and the number of connections needed for proper signal transmission and reception. The integrated signal chain 510 can be a single LRU placed above the EL-axis, thereby eliminating bundles of IF cables. Redundant energy chains (not labeled) can be provided for non-IF cable management (e.g. power, optical, Ethernet), between components of the integrated signal chain 510 and other system components.

As may best be seen by referring to FIGS. 4 and 5, the integrated signal chain 510 includes a transmit module assembly 520 and a receive module assembly 524 coupled to a waveguide network 528 in a planar configuration. The transmit module assembly 520, receive module assembly 524, and waveguide network 528 collectively define a transmit/receive assembly 532 of the integrated signal chain 510. The transmit/receive assembly 532 may be secured to a first portion of the bridge bracket 330 or main structural beam 424 (see FIGS. 6A and 6B) of the respective antenna mounting assembly, or otherwise housed within a first portion of an enclosure that is secured to the bridge bracket 330 or main structural beam 424.

The integrated signal chain 510 further includes a modem and thermal management assembly 536 that may be secured to a second portion of the bridge bracket 330 or main structural beam 424 of the respective antenna mounting assembly, or otherwise housed within a second portion of an enclosure that is secured to the bridge bracket 330 or main structural beam 424. For instance, the modem and thermal management assembly 536 may include components secured to a mounting plate or PCBA structure 538, which can be pre-assembled and thereafter mounted as a unit to the antenna mounting assembly.

The components of the modem and thermal management assembly 536 may include a modem assembly 540, a thermal management assembly 544, and a GPS assembly 548 (having a GPS receiver, etc.) secured to the mounting plate or PCBA structure 538. The modem assembly 540 may include a PCBA and a heatsink optionally inside an enclosure. The modem assembly 540 may be located along the same planar configuration between the transmit/receive assembly 532 and the thermal management assembly 544.

The thermal management assembly 544 may be used to cool the entire integrated signal chain 510, for example, along an airflow path, as opposed to using individual thermal management structures for each component. In that regard, the thermal management assembly 544 may include one or more fans and cooling shrouds for directing airflow across the modem assembly 540 and the transmit/receive assembly 532. Accordingly, the thermal management assembly 544 may cause convection heat transfer away from one or more of the modem assembly 540, the receive module assembly 520, and the transmit module assembly 524.

In the embodiment depicted, first and second fans 546a and 546b (see FIGS. 4 and 5) are located at a first end of the integrated signal chain 510 and draw or deliver air across its length toward the second end. The fans 546a and 546b may be a redundant configuration such that a single fan supports heat dissipation needs of the integrated signal chain 510 if the other fan fails. The fans may be configured to deliver airflow along an airflow path, such as a single airflow path. A shroud (such as secondary housing 414 shown in FIG. 6A) encloses the fans 546a and 546b and directs air across the components of the integrated signal chain 510. Thus, as can appreciated, arranging the components of the integrated signal chain 510 in a side-by-side, adjacent, in-line, and/or planar configuration allows for the use of a simplified, reliable thermal management assembly.

Some or all of the individual components of the integrated signal chain 510 may be housed within individual enclosures for optimizing installation, servicing, thermal management, etc. For instance, referring back to FIGS. 6A and 6B, the RF components can be enclosed in a main housing 412, and thermal management components may be enclosed within a secondary housing 414. Portions of the main housing 412 and/or the secondary housing 414 may define a plenum for controlling air flow past the RF components.

Figure 7:
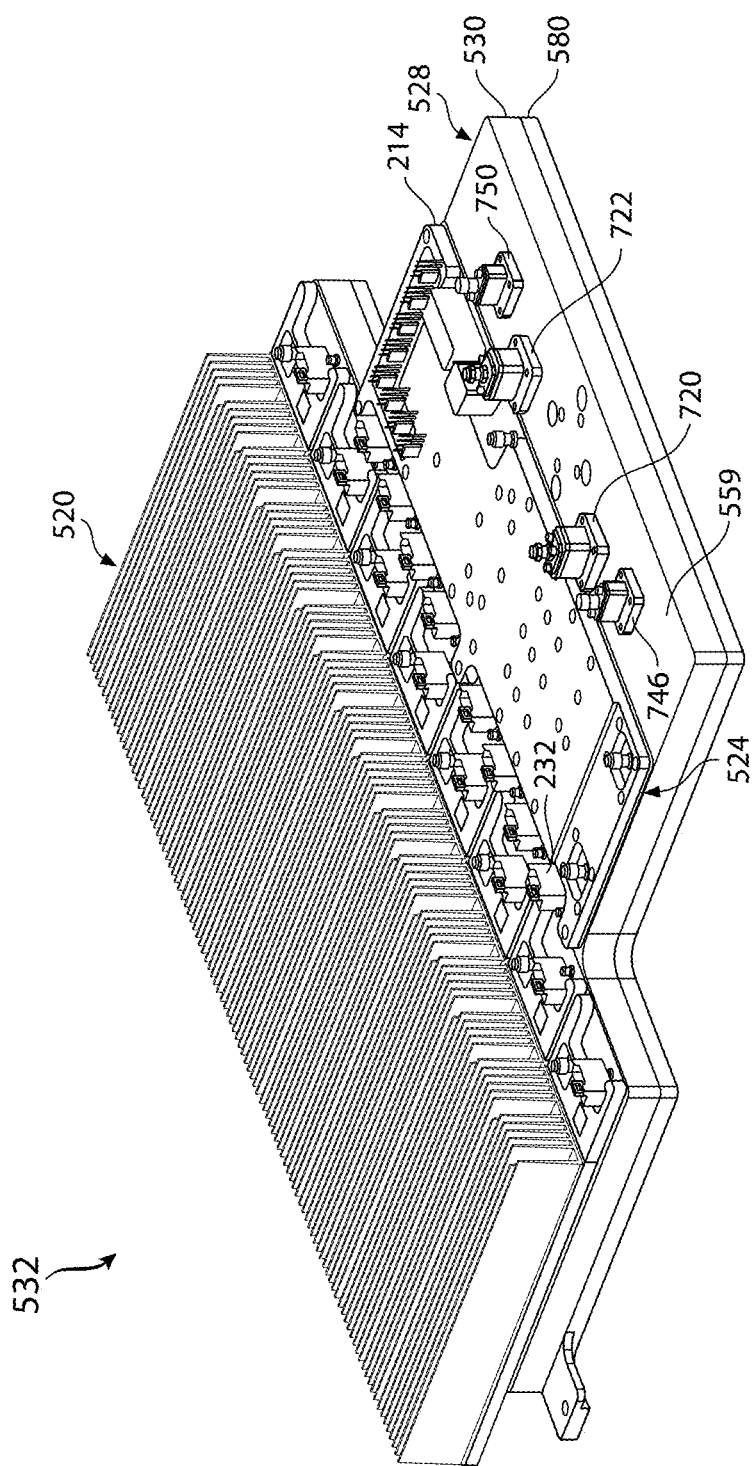
FIG. 7 is an isometric view of the integrated signal chain of FIG. 4 or 6A.
Figure 8:
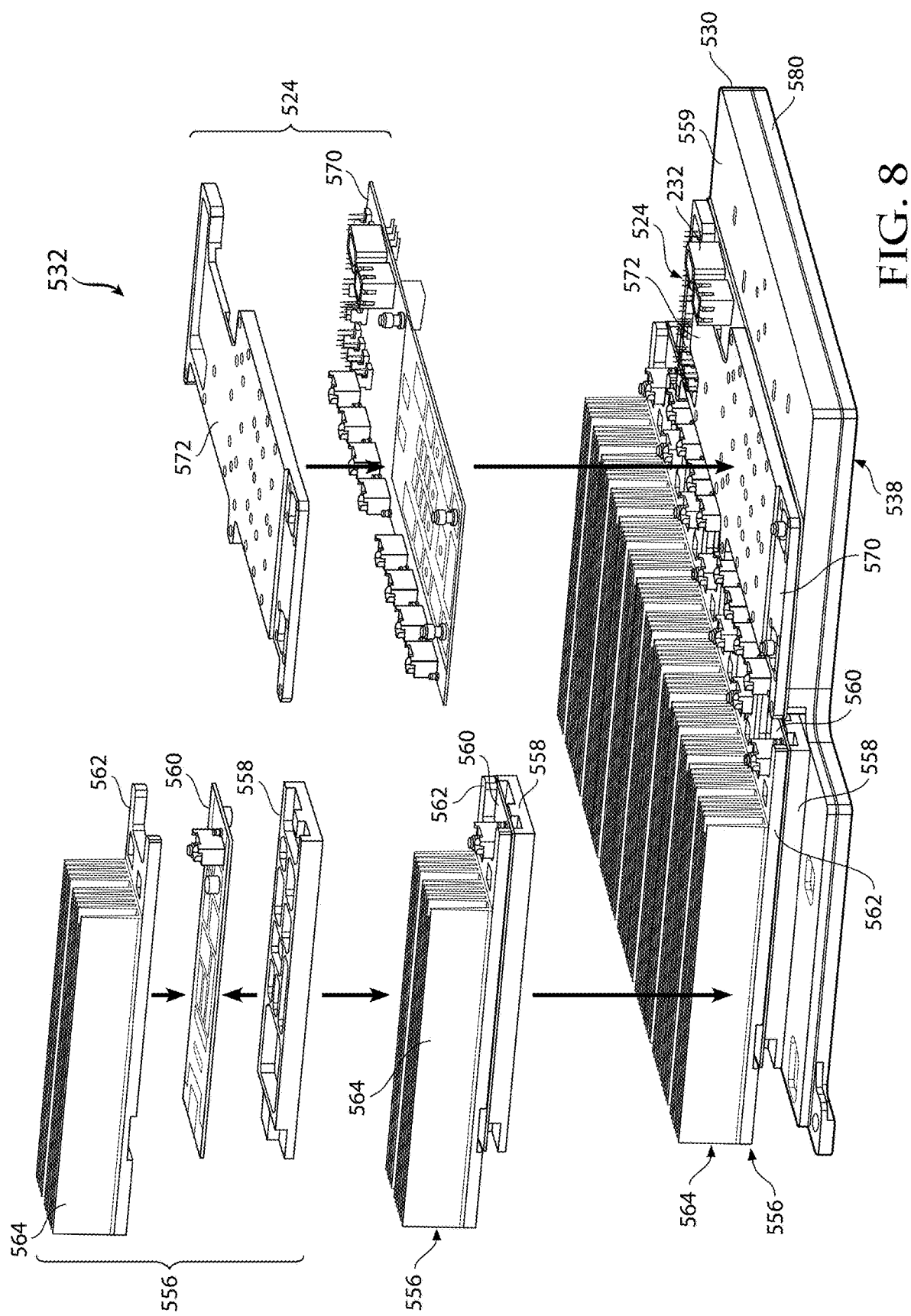
FIG. 8 is an exploded isometric view of the integrated signal chain of FIG. 7.

Referring to FIGS. 7 and 8, the transmit module assembly 520 of the transmit/receive assembly 532 will now be described. The transmit module assembly 520 includes one or more transmit modules 556 (eight transmit modules 556 are shown in FIG. 7). Each transmit module 556 can respectively include an optional transmit module base 558 securable to an exterior or top surface 559 of the waveguide network 528, a transmit module circuit board 560 securable to the transmit module base 558, a transmit module heatsink plate 562 securable to the transmit module base 558, and a transmit module heatsink 564 securable to the transmit module heatsink plate 562. The waveguide network 528 may include a recessed portion to accommodate the height of the transmit module assembly 520, thereby preventing the transmit module assembly 520 from protruding significantly from the overall substantially planar structure of the integrated signal chain 510.

The transmit module circuit board 560 is configured to support RF components suitable for transmitting at least some of the gateway system signals to another node on a network, such as one or more satellites. In that regard, the transmit/receive assembly 532 may be configured with any suitable number of transmit module circuit boards 560 to support RF communication requirements of the gateway system.

The transmit module heatsink 564 can be configured as a finned heat dissipation device, with fins (not separately labeled) extending substantially transversely from the transmit module heatsink plate 562. In this manner, heat can be effectively dissipated from the heat-generating components of the transmit module circuit board 560 when the integrated signal chain 510 is mounted to the back of a reflector or parabolic antenna.

The transmit module base 558 may be securable to both the exterior surface 559 of the waveguide network 528 and the transmit module circuit board 560 in any suitable manner, such as with fasteners, adhesive, snap-fit connections, etc. In the alternative, the transmit module base 558 may be omitted and the transmit module circuit board 560 may be secured directly to the exterior surface 559 of the waveguide network 528. The transmit module heatsink plate 562 may be securable to both the transmit module circuit board 560) and the transmit module heatsink 564 in any suitable manner, such as with fasteners, adhesive, snap-fit connections, etc. Thermal interface material (TIM), RF absorber pads, etc. may be used between layers as needed to address heat dissipation and RF requirements.

Each transmit module 556 can be assembled prior to building the integrated signal chain 510, decreasing the cost and complexity of the integrated signal chain 510 assembly process. The modular configuration of the transmit module 556 also allows each module to be independently installed, repaired, and/or serviced. Moreover, by being secured to the exterior surface 559 of the waveguide network 528, the transmit modules 556 are easy to access when the integrated signal chain 510 is mounted to the back of an antenna (such as when mounted to the bridge bracket 330 or similar). Although eight transmit modules 556 are shown in the integrated signal chain 510, any other suitable number of transmit modules 556 can be used depending on gateway system bandwidth needs, power requirements, and other considerations.

Still referring to FIGS. 7 and 8, the receive module assembly 524 of the transmit/receive assembly 532 will now be described. The receive module assembly 524 includes a receive module circuit board 570 securable to the exterior surface 559 of the waveguide network 528 and a receive module heatsink base 572 securable to the receive module circuit board 570. A receive module heatsink (not shown) may be secured to the receive module heatsink base 572. It should be noted that FIG. 8 shows the same receive module assembly 524 both exploded and mounted to the waveguide network 528 for illustration purposes.

The receive module circuit board 570 is configured to support RF components suitable for receiving at least some of the gateway system signals from another node on a network, such as a ground network. In that regard, the transmit/receive assembly 532 may be configured with any suitable number of receive module circuit boards 570 to support RF communication requirements of the gateway system.

The receive module heatsink can be configured as a finned heat dissipation device, with fins extending substantially transversely from the receive module heatsink base 572. In this manner, heat can be effectively dissipated from the heat-generating components of the receive module circuit board 570 when the integrated signal chain 510 is mounted to the back of a reflector or parabolic antenna.

The receive module circuit board 570 may be securable to the exterior surface 559 of the waveguide network 528 in any suitable manner, such as with fasteners, adhesive, snap-fit connections, etc. Similarly, the receive module heatsink base 572 may be securable to the receive module circuit board 570 (and the receive module heatsink) in any suitable manner, such as with fasteners, adhesive, snap-fit connections, etc. Thermal interface material (TIM), RF absorber pads, etc. may be used between layers as needed to address heat dissipation and RF requirements.

The receive module assembly 524 can be assembled prior to building the integrated signal chain 510, decreasing the cost and complexity of the integrated signal chain 510 assembly process. Moreover, by being secured to the exterior surface 559 of the waveguide network 528, the receive module assembly 524 is easy to access when the integrated signal chain 510 is mounted to the back of a reflector or parabolic antenna. Although only a single receive module assembly 524 is shown in the integrated signal chain 510, any other suitable number of receive module assemblies 524 can be used depending on gateway system bandwidth needs, power requirements, and other considerations. For instance, in some embodiments, the receive module assembly 524 includes first and second receive module circuit boards, each having a different polarization.

Figure 9:
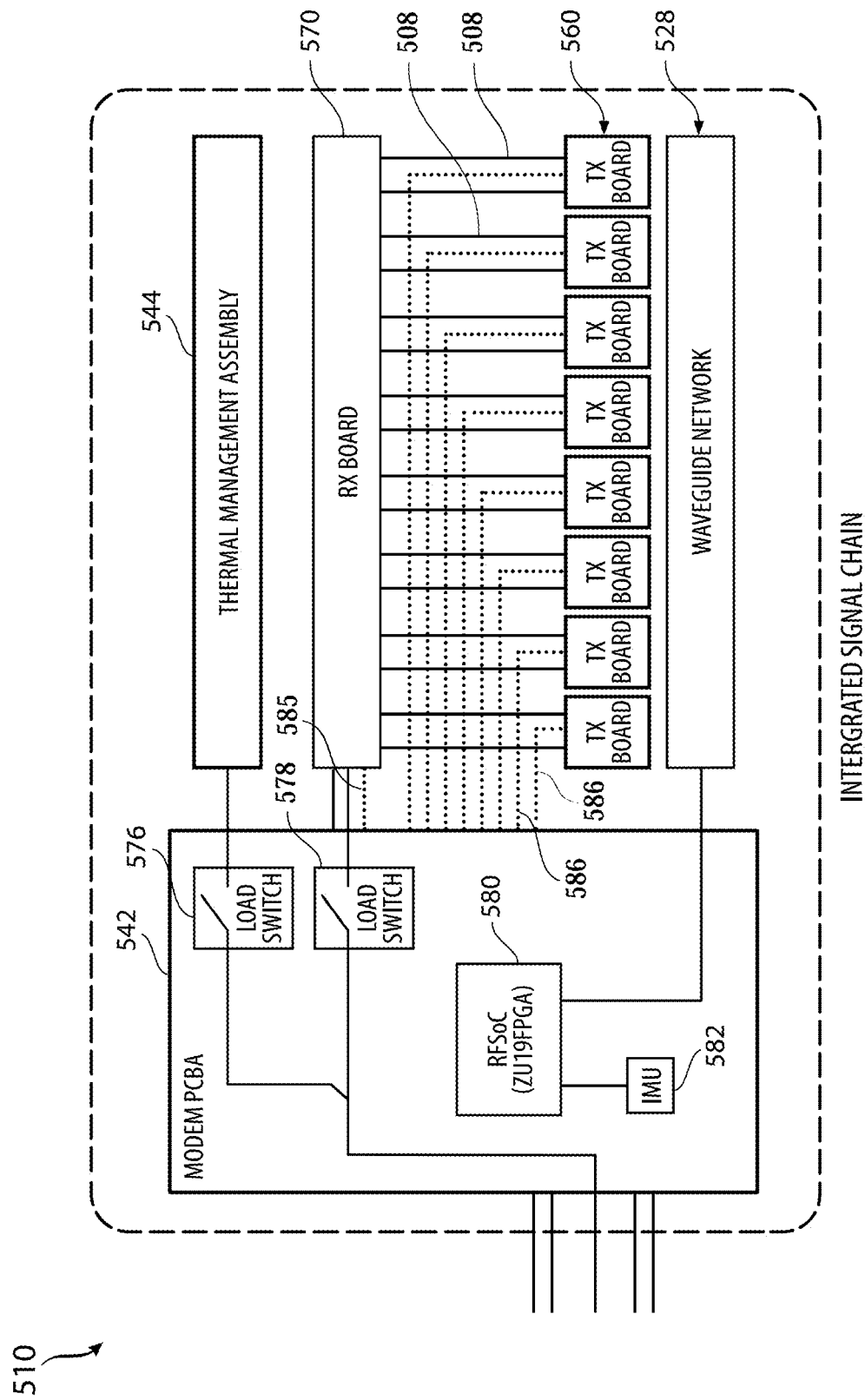
FIG. 9 is a block diagram of the integrated signal chain of FIG. 4 or 6A.

FIG. 9 illustrates an exemplary block diagram of the integrated signal chain 510 having a modem PCBA 542, the receive module circuit board 570, transmit module circuit boards 560, the thermal management assembly 544 (such as one or more fans, cooling shrouds, etc.), and the waveguide network 528. The integrated signal chain 510 may also include other components not shown.

The modem PCBA 542 is electrically coupled to power components of the gateway system, among other components. In that regard, the modem PCBA 542 includes a first load switch 576 that selectively supplies power to the thermal management assembly 544, and a second load switch 578 that selectively supplies power to the receive module circuit board 570. Power is supplied to each of the transmit module circuit boards 560 from the receive module circuit board 570 through a plurality of jumpers 508, which supply power and which also transmit digital and reference (i.e., clock) signals. A radio frequency system-on-chip (RF SoC) 580, which can be a field-programmable gate array, is connected to an inertial measuring unit (IMU) 582 and the waveguide network 528.

The modem PCBA 542 is also communicatively coupled to the receive module circuit board 570 and the transmit module circuit boards 560 through a first IF line 585 and a plurality of second IF lines 586, respectively, for receiving, processing, and transmitting signals/data between the gateway system and other nodes on the network. More specifically, the receive module circuit board 570 provides a signal to the modem PCBA 542 that can convert the signal into appropriately formatted data (such as the Internet Protocol) for transmission to a ground network, such as the Internet. Data from the ground network can be received at the modem PCBA 542, which is converted from an Internet Protocol to a signal for transmission. Signals are sent via the modem PCBA 542 to the transmit module circuit boards 560 for transmission to the satellite(s).

Arranging the components of the integrated signal chain 510 in a side-by-side planar configuration allows for the use of simplified communicative coupling between the components. In other words, with the modem PCBA 542 located adjacent the receive module circuit board 570, simple, short jumpers may be used to communicatively couple the modem PCBA 542 to the receive module circuit board 570. Similarly, with the receive module circuit board 570 located adjacent the transmit module circuit boards 560, simple, short jumpers may be used to communicatively couple the receive module circuit board 570 to the transmit module circuit boards 560.

RF absorber pads (not shown) can be used to attenuate resonant frequencies, cavity oscillations and harmonics that could interfere with electronic system operation or cause non-compliance. For instance, RF components sitting in cavities on the receive module circuit board 570 (not shown in detail) can create undesirable resonant frequencies. RF absorber pads may be used to attenuate those cavity resonances. RF absorber pads may also be used as termination for some of the wave guides used for test ports, as will be further described below.

Referring to FIGS. 7-11, the waveguide network 528 configured to support the planar, integrated signal chain 510 will now be described in detail. In general, the waveguide network 528 is a low profile system that may include diplexer or triplexer assemblies that may be connected to a parabolic reflector. In one example, the waveguide network 528 includes a first waveguide layer made from a first single piece of material and a second waveguide layer made from a second single piece of material. The first and second waveguide layers may then each include the respective structure for corresponding partial channels, such that when the two layers are assembled together in a waveguide stack or structure, they form complete channels defining the waveguide channels that are used to transmit and receive electromagnetic waves from or to the antenna structure.

As seen in FIG. 8, one exemplary structure of the waveguide network 528 includes a first waveguide layer or first planar clamshell portion 530, which may be made from a single piece of material and which includes a first side (the exterior side 559) and a second side. The exemplary structure of the waveguide network 528 further includes a second waveguide layer or second planar clamshell portion 580, which may be made from a single piece of material and which includes a first side and a second side. The first and second planar clamshell portions 530 and 580 each include first, second, third, and fourth corners 529, 531, 533, and 535 of a planar structure (see FIG. 11) defined on an X- and Y-axis (see, e.g., FIG. 12 for an exemplary waveguide network with X, Y, and Z axes show for orientation), with corners 529 and 535 located at or near a first end of the waveguide structure and corners 531 and 533 at or near a second end of the waveguide structure. The height or depth of the first and second planar clamshell portions 530 and 580 is defined along a Z-axis.

The first and second planar clamshell portions 530 and 580 can be secured together in a clamshell structure (using a robot or manually) with mechanical fasteners, adhesives, brazing, etc.

When secured together, the second side of the first planar clamshell portion 530 and the first side of the second planar clamshell portion 580 combine to form a first waveguide channel (first WGC) 584 configured to communicate first electromagnetic signals associated with an antenna and a second waveguide channel (second WGC) 588 configured to communicate second electromagnetic signals associated with the antenna assembly 200. The waveguide channels may be formed in either one or both of the planar clamshell portions 530 and 580. The first and second WGCs 584 and 588 can be made, for example, by machining, molding, or etching the channels in any materials suitably used for waveguides such as metals like brass, copper, silver, aluminum, aluminum alloy, or metal alloys, or plastics or other material. In one example, the waveguide channels may be formed in the first planar clamshell portion 530, and the second planar clamshell portion 580 can act as a "cap" to provides at least some capping structures for waveguide channels and/or filtering components.

The first WGC 584 and the second WGC 588 can be co-planar in the sense that they are configured in a same general horizontal structure defined by the first and second planar clamshell portions 530 and 580. In the depicted embodiment, the first WGC 584 and the second WGC 588 have a planar structure with a split plane in the broad wall of the waveguide filters disclosed herein. This is referred to as an E-plane split. Alternate layouts can have the waveguides flipped over on their side for an H-plane (magnetic field plane) split, where the split plane is orthogonal to the E-field or electric field.

The first WGC 584 and the second WGC 588 each have a cross-sectional area defined at least in part by the second side of the first planar clamshell portion 530 and the first side of the second planar clamshell portion 580 along a length of each of the first and second WGCs 584 and 588. The E-plane split may intersect the cross-sectional area of each of the first and second WGCs 584 and 588 at every point along their lengths. If an H-plane split was instead used, the waveguide channels may be formed in the first or second planar clamshell portion 530 or 580, and the other of the first or second planar clamshell portion 530 or 580 can act as a "cap" for the waveguide channels and/or filtering components. If an H-plane split was used, additional mechanical fasteners may be needed to secure the clamshell portions together to ensure proper signal propagation in the waveguides. In the alternative, brazing may be used to secure the clamshell portions together in an H-plane split waveguide configuration.

The first WGC 584 can include at least one multiplexer (e.g., a collection of filters) for frequency-domain multiplexing of the first electromagnetic signals. The second WGC 588 can include at least one multiplexer for frequency-domain multiplexing of the second electromagnetic signals. The at least one multiplexer in the first WGC 584 can include at least one of a first diplexer or a first triplexer. The at least one multiplexer in the second WGC 588 can include at least one of a second diplexer or a second triplexer.

In a diplexer assembly, two signals in two different frequency bands can coexist in a waveguide without interference. In a triplexer assembly, three different signals can exist in three different frequency bands without interference. The layout of the waveguide network 528 is configured such that signals can be multiplexed on disjointed frequency bands. As a result, the signals can coexist and be simultaneously transmitted and/or received at the antenna feed without interfering with each other. Thus, the waveguide network 528 can represent a diplexer assembly or a triplexer assembly on which disjointed frequency bands are multiplexed without interference in the same waveguide channels.

Figure 10:
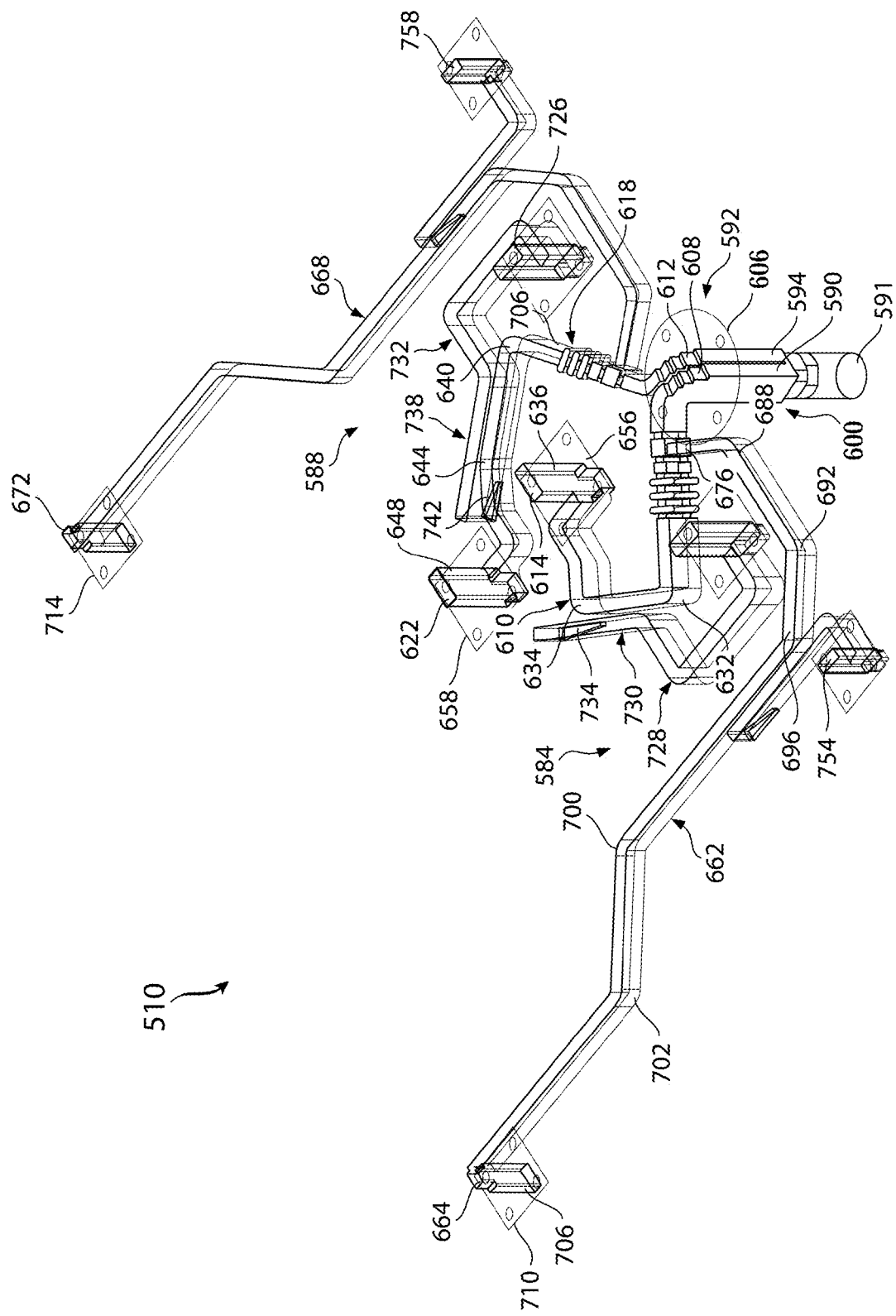
FIG. 10 is an isometric view of an interior of the waveguide network of the integrated signal chain of FIG. 4 or 6A.
Figure 11:
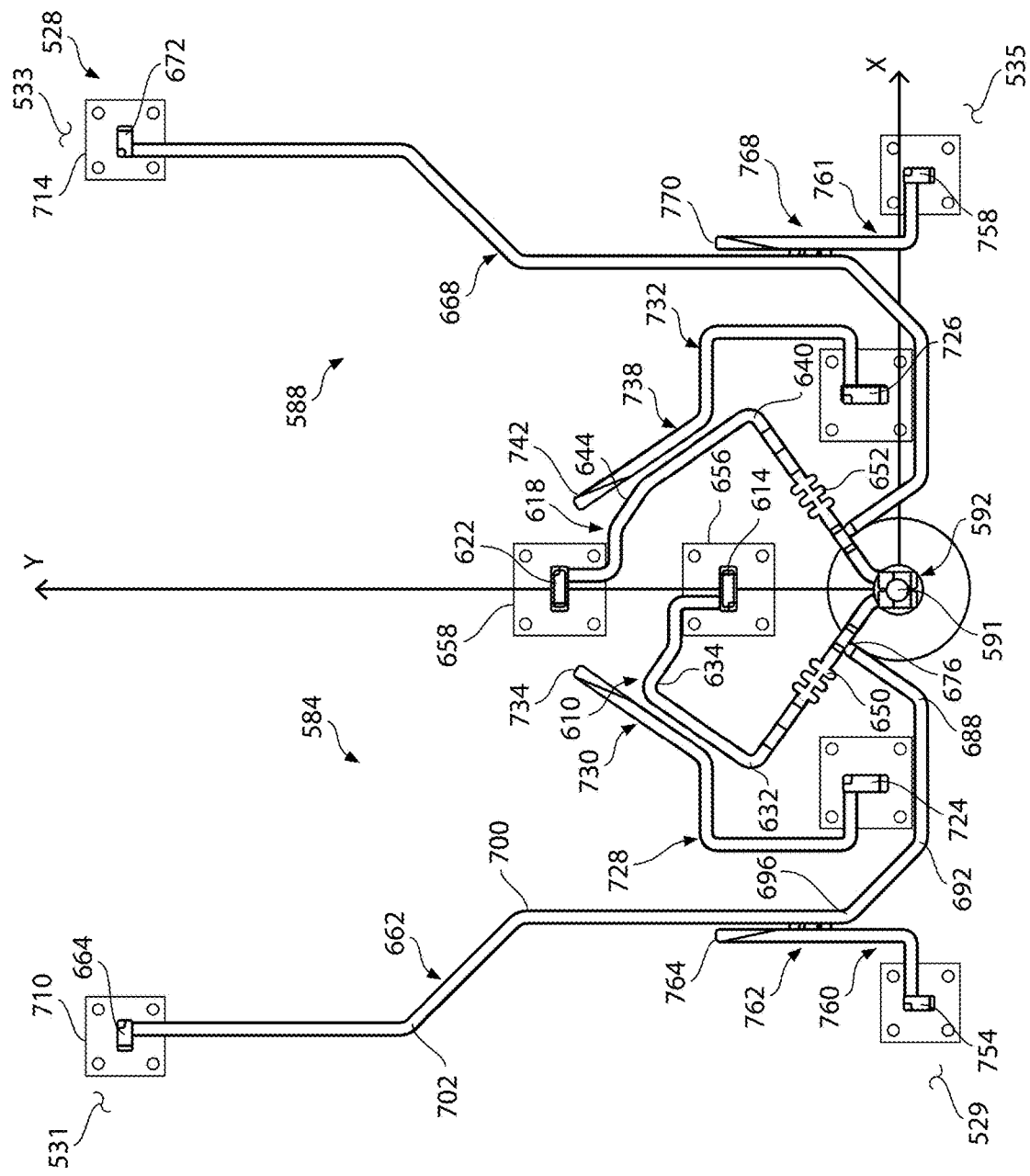
FIG. 11 is a top view of the interior of the waveguide network of the integrated signal chain of FIG. 4 or 6A.

Referring to FIG. 10-11, the first WGC 584 and the second WGC 588 of the waveguide network 528 will now be described in detail. In general, the first and second WGCs 584 and 588 are configured to communicate signals between the septum polarizer 600 (which may be, for example, septum polarizer 444 shown in FIG. 6B) and the RF components in the integrated signal chain 510. The septum polarizer 600 can provide one or both of right hand circular polarization (RHCP) or left hand circular polarization (LHCP) of signals. Other polarization definitions can be utilized as well.

The first and second WGCs 584 and 588 may include a number of different waveguide sub-channels and/or branches. More particularly, the first and second WGCs 584 and 588 include a number of sub-channels and/or branches extending from an antenna feed 592 to a plurality of receive ports and transmit ports. Any bend or straight portion of a respective waveguide can be utilized to enable the waveguide to reach its desired transmit or receive port. Such bends or straight portions can also be used for signal processing purposes and can include various types of filters.

The various waveguide channels, sub-channels, and/or branches (hereinafter sometimes simply referred to as a "waveguide section") can have a planar structure or geometry in which the electromagnetic signals are guided in only one dimension. For instance, the waveguide sections may be bound only in one dimension in which reflections of the electromagnetic signals occur only in one direction and the system includes only one mode number.

Furthermore, this disclosure may introduce or define a "waveguide channel" as a selection of one or more of the sub-channels. Any combination of one or more sub-channels can be used to define a particular waveguide channel. The purpose of defining a particular waveguide channel can be, for example, to cover a pathway from a chosen transmitter through a portion of a particular waveguide channel to the antenna structure, or to cover a pathway from the antenna structure through a portion of a particular waveguide channel to a chosen receiver.

In the depicted exemplary embodiment, the first WGC 584 includes a first waveguide receive sub-channel (WRXSC) 610, and the second WGC 588 includes a second waveguide receive sub-channel (WRXSC) 618. The first WRXSC 610 is configured to provide a path for electromagnetic signals received from a common port 591 of the antenna feed 592 (hereinafter sometimes simply "the antenna feed 592") to a first receive port 614 at or near the end of the first WRXSC 610. Similarly, the second WRXSC 618 is configured to provide a path for electromagnetic signals received from the antenna feed 592 to a second receive port 622 at or near the end of the second WRXSC 618.

Referring to FIG. 10, the common port 591 of the antenna feed 592 interfaces with the waveguide network 528 through a waveguide polarizer manifold flange 606.

The first WRXSC 610 interfaces with a first waveguide feed section 590 in the septum polarizer 600 of the antenna feed 592 to communicate signals between the common port 591 of the antenna feed 592 and the first WGC 584. The first waveguide feed section 590 interfaces with the first WRXSC 610 through a first waveguide bend 608, which may be an H-plane bend, a block-miter bend, a two-step transition, etc. A 1-step transition may also be used, which can eliminate undercut.

Similarly, the second WRXSC 618 interfaces with a second waveguide feed section 594 in the septum polarizer 600 of the antenna feed 592 to communicate signals between the common port 591 of the antenna feed 592 and the second WRXSC 618. The second waveguide feed section 594 interfaces with the second WRXSC 618 through a second waveguide bend 612, which may be an H-plane bend, a block-miter bend, a one or two-step transition, etc. The first and second waveguide bends 608 and 612 define a portion of a twin waveguide interface to the septum polarizer 600. Although the septum polarizer 600 is mentioned by way of example, any transitional converter can be utilized.

Referring to FIG. 11, the first WRXSC 610 branches out from the first waveguide bend 608 of the antenna feed 592, which is located at a central front region of the waveguide network 528, and more particularly at the intersection of the X and Y-axis. The first WRXSC 610 branches out from the antenna feed 592 and terminates at the first receive port 614, which is spaced from the antenna feed 592 along the Y-axis. In that regard, the first WRXSC 610 has a length between the antenna feed 592 and the first receive port 614.

The first WRXSC 610 can be shaped to optimize its length between the antenna feed 592 and the first receive port 614. In the illustrated embodiment, the first WRXSC 610 extends a first distance diagonally from the antenna feed 592 toward the first waveguide transmit sub-channel (WTXSC) 662 (away from the Y-axis). At an approximate middle point, the first WRXSC 610 includes a first transition and E-plane bend (or simply hereinafter referred to as an "elbow") 632 that turns the first WRXSC 610 back toward the Y-axis. After extending from the first elbow 632 a second distance substantially equal to the first distance, the first WRXSC 610 includes a second elbow 634 that turns the first WRXSC 610 diagonally down toward the X- and Y-axis. The first WRXSC 610 may include any additional necessary elbows (not separately labeled) in between the second elbow 634 and the first receive port 614 located at the Y-axis to connect terminating waveguide section(s) of the first WRXSC 610 to a waveguide straight section 636 (extending along the Z-axis, as shown in FIG. 10) of the first receive port 614.

The second WRXSC 618 similarly branches out from the second waveguide bend 612 of the antenna feed 592 in a direction opposite or mirrored from the first WRXSC 610. The second WRXSC 618 branches out from the antenna feed 592 and terminates at the second receive port 622, which is spaced from the antenna feed 592 and the first receive port 614 further along the Y-axis near a central portion of the waveguide network 528. In that regards, the second WRXSC 618 has a length between the antenna feed 592 and the second receive port 622.

The second WRXSC 618 can also be shaped to optimize its length between the antenna feed 592 and the second receive port 622. In the illustrated embodiment, the second WRXSC 618 extends a first distance diagonally from the antenna feed 592 toward the second WTXSC 668 (away from the Y-axis). At an approximate middle point, the second WRXSC 618 includes a first elbow 640 that turns the second WRXSC 618 back toward the Y-axis. After extending from the first elbow 640 a second distance substantially equal to the first distance, the second WRXSC 618 includes a second elbow 644 that turns the second WRXSC 618 slightly further toward the Y-axis. The second WRXSC 618 may include any additional necessary elbows (not separately labeled) in between the second elbow 644 and the second receive port 622 located at the Y-axis to connect terminating waveguide section(s) of the second WRXSC 618 to a waveguide straight section 648 (extending along the Z-axis, as shown in FIG. 10) of the second receive port 622.

Referring to FIGS. 10-11, the first and second WRXSC 610 and 618 can each include a filter structure configured to filter out noise or pass a certain frequency band. For instance, the first WRXSC 610 can include a third order low-pass filter 650 within the first WRXSC 610 using a stub filter. Likewise, the second WRXSC 618 can include a filter structure configured to filter out noise or to pass certain frequency bands. For instance, the second WRXSC 618 can include a third order low-pass filter 652 within the second WRXSC 618 using a stub filter.

The "order" of the low pass filter defines the filter response per octave or decade (or other unit) of frequency. For example, a third order low pass filter might decrease at −18 dB per octave of increasing frequency after the cutoff frequency. The various filters will control which signals can be transmitted via the respective waveguide channels. The particular configuration of the filter structure can vary depending on the frequencies desired to be passed through the first and second WRXSC 610 and 618.

The receive module circuit board 570 is mounted directly to first and second flanged ends 656 and 658 of the waveguide straight sections 636 and 648 of the first and second receive ports 614 and 622 using a bolt pattern per UG595 standards, or equivalent. With the receive module circuit board 570 mounted directly to the multiplexer assembly of the waveguide network 528, signals are received by the receive module assembly 524 from the antenna feed 592 with minimal insertion loss.

The first and second WRXSC 610 and 618 of the first and second receive waveguide subassemblies 596 and 602 also have a shape that optimally positions the first and second receive ports 614 and 622 close to the location of the antenna feed 592. In this manner, signal losses are reduced as signals are communicated from the antenna feed 592 through the first and second RX waveguide sub-channels 610 and 618 to the respective first and second receive ports 614 and 622.

The shape of the first and second WRXSC 610 and 618 supports the side-by-side, substantially planar configuration of the integrated signal chain 510. However, it should be appreciated that other WRXSC shapes may instead be used. For instance, if the transmit module assembly 520, receive module assembly 524, and modem assembly 540 were not arranged side-by-side in a single substantially planar configuration, the first and second WRXSC 610 and 618 may instead be shaped to position the first and second receive ports 614 and 622 in other optimal locations relative to the location of the antenna feed 592. Accordingly, the description and illustrations provided herein should not be seen as limiting.

First and second waveguide transmit sub-channels (WTXSCs) 662 and 668 of the first and second WGCs 584 and 588 will now be described. The first WTXSC 662 is configured to provide a path for electromagnetic signals received from a first transmit port 664 at or near the end of the first WTXSC 662 to the antenna feed 592. Similarly, the second WTXSC 668 is configured to provide a path for electromagnetic signals received from a second transmit port 672 at or near the end of the second WRXSC 668 to the antenna feed 592. In the illustrated embodiment, the first and second WRXSCs 662 and 668 are substantially identical and mirror images of one another. In that regard, only the first WTXSC 662 will be described in detail.

The first WTXSC 662 branches out from the first WRXSC 610 at a multiplexing junction 676, such as an E-plane manifold junction optionally with irises for optimizing return loss. Each respective iris places a shunt inductive reactance across the waveguide that is directly proportional to the size of the opening. The edges of the inductive iris are perpendicular to the magnetic plane. Other junction structures can be used as well, such as a T-junction. In one example, the junction can have a reduced height to suppress spurious responses at certain frequency ranges.

The first WTXSC 662 extends between the multiplexing junction 676 and the first transmit port 664. The multiplexing junction 676 is located between the antenna feed 592 and the filter 650 within the first WRXSC 610, near a central front region of the waveguide network 528. The first transmit port 664 is located at or near the second corner 531 of the waveguide network 528. As such, the first transmit port 664 is a maximum distance from the location of the antenna feed 592.

The first WTXSC 662 can be shaped to optimize its length between the antenna feed 592 and the first transmit port 664. In the illustrated embodiment, the first WTXSC 662 extends a first distance from the antenna feed 592 toward the front edge of the waveguide network 528 near the X-axis. After passing the X-axis, the first WTXSC 662 includes a first elbow 688 that softly turns the first WTXSC 662 toward the outer edge of the waveguide network 528 (away from the central Y axis) in a direction parallel to the X-axis.

The first WTXSC 662 extends from the first elbow 688 a second distance and then turns diagonally upwardly toward the second corner 531 at a second elbow 692. After extending a third distance, at a third elbow 696, the first WTXSC 662 turns upwardly and extends along a direction parallel to the Y-axis a fourth distance. At a location about halfway between the first and second corners 529 and 531 of the waveguide network 528, the first WTXSC 662 turns diagonally upwardly toward the first corner 684 at a fourth elbow 700. The first WTXSC 662 extends a fifth distance and then turns upwardly toward the first corner 684 at a fifth elbow 702. A terminating waveguide section of the first WTXSC 662 extends a sixth distance along a direction parallel to the Y-axis until it terminates at the first transmit port 664 located substantially at the second corner 531 of the waveguide network 528. The first WTXSC 662 may include any additional necessary sections and elbows to connect the terminating waveguide section of the first WTXSC 662 to a waveguide straight section 706 (extending along the Z-axis) of the first transmit port 664.

The transmit module circuit board 560 is mounted directly to first and second flanged ends 710 and 714 of the waveguide straight sections (only the first waveguide straight section 706 labeled) of the first and second transmit ports 664 and 672 using a bolt pattern per UG599 standards, or equivalent. With the transmit module circuit board 560 mounted directly to the multiplexer assembly of the waveguide network 528, signals are transmitted by the transmit module circuit board 560 to the antenna feed 592 with minimal insertion loss.

The first and second WTXSC 662 and 668 of the first and second transmit waveguide subassemblies 598 and 604 also have a shape that optimally positions the first and second transmit ports 664 and 672 a maximum distance from the location of the antenna feed 592. In this manner, signal losses are reduced as signals are communicated from the first and second transmit ports 664 and 672 to the antenna feed 592 through the first and second WTXSC 662 and 668.

The shape of the first and second WTXSC 662 and 668 supports the side-by-side, substantially planar configuration of the integrated signal chain 510. However, it should be appreciated that other WTXSC shapes may instead be used. For instance, if the transmit module assembly 520, receive module assembly 524, and modem assembly 540 were not arranged side-by-side in a single substantially planar configuration, the first and second WTXSC 662 and 668 may instead be shaped to position the first and second transmit ports 664 and 672 in other optimal locations relative to the location of the antenna feed 592. Accordingly, the description and illustrations provided herein should not be seen as limiting.

The first WTXSC 662 can include a filter structure configured to filter out noise or pass a certain frequency band. For instance, the first WTXSC 662 can include a first high pass filter (not shown) which can be used to pass only high frequency signals or otherwise isolate noise from RX components connected to the first transmit port 664. In a particular embodiment, the high pass filter is within a WR-28 waveguide section, for instance between at least the first and second elbows on the first WTXSC 662, or at another suitable location near the multiplexing junction 676, and has a cutoff frequency of 21.07 GHz (Fc=21.07 GHz) for controlling the bandwidth of signals that can pass through the first WTXSC 662. The particular configuration of the filter structure can vary depending on the frequencies desired to be passed through the first WTXSC 662.

The filters disclosed herein with respect to the first WGC 584 and the second WGC 588 are configured to provide RF isolation amongst entrances and exits to the various RF components of the printed circuit boards, such as components that receive signals from the antenna feed 592 and other components that provide signals for transmission of signals to the antenna feed 592. The filters provide RF isolation from the various components, power amplifiers, low noise amplifiers, and so forth, as signals move across the waveguide network 528. The filters may be high-pass filters, low-pass filters, or band-pass filters and have structures to provide the desired frequency response in their respect locations within the waveguide network 528.

For example, high-pass filters can be used to enable higher frequencies in the receive band from the antenna feed 592 to pass to the receive module RF components. Low-pass filters can be used to pass the lower frequency transmit bands to pass signals from transmission components, through the waveguide network 528 to the antenna feed 592. Band-pass filters (filters cascading a low pass filter with a high pass filter) can be used to pass frequencies within a certain range or bandwidth (a frequency range between two specified frequency cut-off points) and while rejecting or attenuating all the frequencies outside the range. The various filters disclosed herein can be implemented through different structures such as inductive irises, corrugated filters, or other structures to provide the passing or blocking of desired certain frequency bands through a particular channel or branch. The filters may be included on the first and/or second waveguide layers or planar clamshell portions 530 and 580.

Notably, the power provided in the signals from transmit ports 664 and 672 can be many levels of magnitude higher than the power of the signals received by the receive ports 614 and 622. One purpose for the filters disclosed herein is to prevent the more powerful transmission signals from transmit ports 664 and 672 from leaking in or passing to the receive ports 614 and 622. For example, when generating an 18 GHz signal, a transmit port may also generate a 36 GHz signal as well. The filtering system would prevent the 36 GHz signal from being communicated to a receive port.

The elbows disclosed herein with respect to the first WGC 584 and the second WGC 588 can be configured to provide a curvilinear shape to the various waveguide sections and can provide an E-plane (electric field vector plane) jog and transition from one direction of the waveguide section to another after the respective elbow. The contoured design of the various waveguide sections enables the waveguide network 528 to be configured to position respective RX components near a central portion of the waveguide network and respective TX components at strategic corner locations in the waveguide network 528. With such a configuration, the RX components and TX components of the integrated signal chain 510 are sufficiently separated to avoid heat transfer or signal leakage between the respective components.

In one example embodiment, one or more of the various waveguide subchannels can be WR-28 waveguides with a cutoff frequency Fc=21.07 GHz for controlling the bandwidth of signals that can pass through any respective waveguide. A WR-28 waveguide has a recommended frequency band of 26.50 to 40 GHz, a cutoff frequency in an upper mode of 42.154 GHz, and a dimension of 0.28 inches by 0.14 inches. These dimensions provide one exemplary waveguide physical structure and other structures are contemplated as well. Different waveguide standards can be used for each of the waveguides. For example, the first and second WTXSC 662 and 668 may use the WR-28 waveguide structure, while the first and second WRXSC 610 and 618 may use a different waveguide structure.

In addition, as discussed above, the first and second receive ports 614 and 622 can be located along a central region of the waveguide network 528 and the first and second transmit ports 664 and 672 can be located in a respective second and third corners 529 and 531 of the waveguide network 528. One purpose of this configuration is to maximize the distance between the high power transmit ports 664 and 672 (and their respective mounted RX components) for thermal separation. This configuration also maximizes the distance between the high power transmit ports 664 and 672 (and their respective mounted TX components) and the receive ports 614 and 622 for thermal separation between transmit and receive components.

In the described embodiment, the first and second transmit ports 664 and 672 are transmit only, meaning that they only generate signals for transmission to the antenna feed 592. Moreover, the first and second receive ports 614 and 622 are receive only, meaning they are only configured to receive signals from the antenna feed 592. In such a configuration, separation of the two sets of signals is desirable and achieved through the separate waveguide channels and filter structures disclosed herein. In other embodiments, other configurations may be desirable. For example, the transmit components could be configured in a central region and separated from receive components configured in respective corners or near a perimeter of the waveguide network 528. Further, any respective port may be configured for coupling with a transmit and/or a receive component.

Once the waveguide network is formed, the integrated signal chain 510 may be tested prior to deployment or in the field for diagnostics. For instance, test coupling ports can be used to test the S-parameters (scattering parameters) of the waveguide network 528. The S-parameters are known to describe the response of an N-port network to signals incident to any or all of the ports. In other words, the S-parameters describe the electrical behavior of the waveguide network. The test coupling ports can be used to perform these tests and then can be replaced with flat closeouts when testing is complete.

First and second receive test coupling ports 720 and 722 (see FIG. 7) may be coupled to first and second receive test ports 724 and 726 of first and second receive test WGCs 728 and 732 for testing the first and second receive WGCs 610 and 618. As can be seen in FIGS. 10 and 11, a first receive directional coupler 730 connects the first receive WGC 610 to the first receive test port 724 via one or more first receive test waveguide sections separated by one or more elbows (not separately labeled). A first receive test wedge termination 734, which can be injection molded, may be integrated into the first receive directional coupler 730. The first receive test coupling port 720 is mounted directly to a first flanged end of a waveguide straight section (not labeled) of the first receive test port 724 using a bolt pattern per UG595 standards, or equivalent.

A second receive directional coupler 738 connects the second receive WGC 610 to the second receive test port 726 via one or more second receive test port waveguide sections separated by one or more elbows (not separately labeled). A second receive test wedge termination 742, which can be injection molded, may be integrated into the second receive directional coupler 738. The second receive test coupling port 722 is mounted directly to a second flanged end of a waveguide straight section (not labeled) of the second receive test port 726 using a bolt pattern per UG595 standards, or equivalent. The first and second receive directional couplers 730 and 738 can be, for example, 25 dB directional couplers using small offset coupling holes (i.e., a Bethe Hole coupler).

First and second transmit test coupling ports 746 and 750 (see FIG. 7) may be coupled to first and second transmit test ports 754 and 758 of first and second receive test WGCs 760 and 761 for testing the first and second transmit WGCs 662 and 668. As can be seen in FIGS. 10 and 11, a first transmit directional coupler 762 connects the first transmit WGC 662 to the first transmit test port 754 via one or more first transmit test waveguide sections separated by one or more elbows (not separately labeled). A first transmit test wedge termination 764, which can be injection molded, may be integrated into the first transmit directional coupler 762. The first transmit test coupling port 746 is mounted directly to a first flanged end of a waveguide straight section (not labeled) of the first transmit test port 754 using a bolt pattern per UG599 standards, or equivalent.

A second transmit directional coupler 768 connects the second transmit WGC 668 to the second transmit test port 758 via one or more second transmit test waveguide sections separated by one or more elbows (not separately labeled). A second transmit test wedge termination 770, which can be injection molded, may be integrated into the second transmit directional coupler 768. The second transmit test coupling port 750 is mounted directly to a second flanged end of a waveguide straight section (not labeled) of the second transmit test port 758 using a bolt pattern per UG595 standards, or equivalent. The first and second transmit directional couplers 762 and 768 can be, for example, 25 dB directional couplers using small offset coupling holes (i.e., a Bethe Hole coupler).

The receive and transmit couplers and test ports can be used to evaluate the S-parameters (scattering-parameters) of the transmission channels of the integrated signal chain 510 prior to deployment. After testing, the coupling ports can be replaced with flat closeouts (not shown, although FIG. 8 shows the couplers removed). Moreover, it should be appreciated that in some embodiments, the test receive and transmit ports, as well as their associated test receive and transmits waveguide channels, may not be included.

Figure 12:
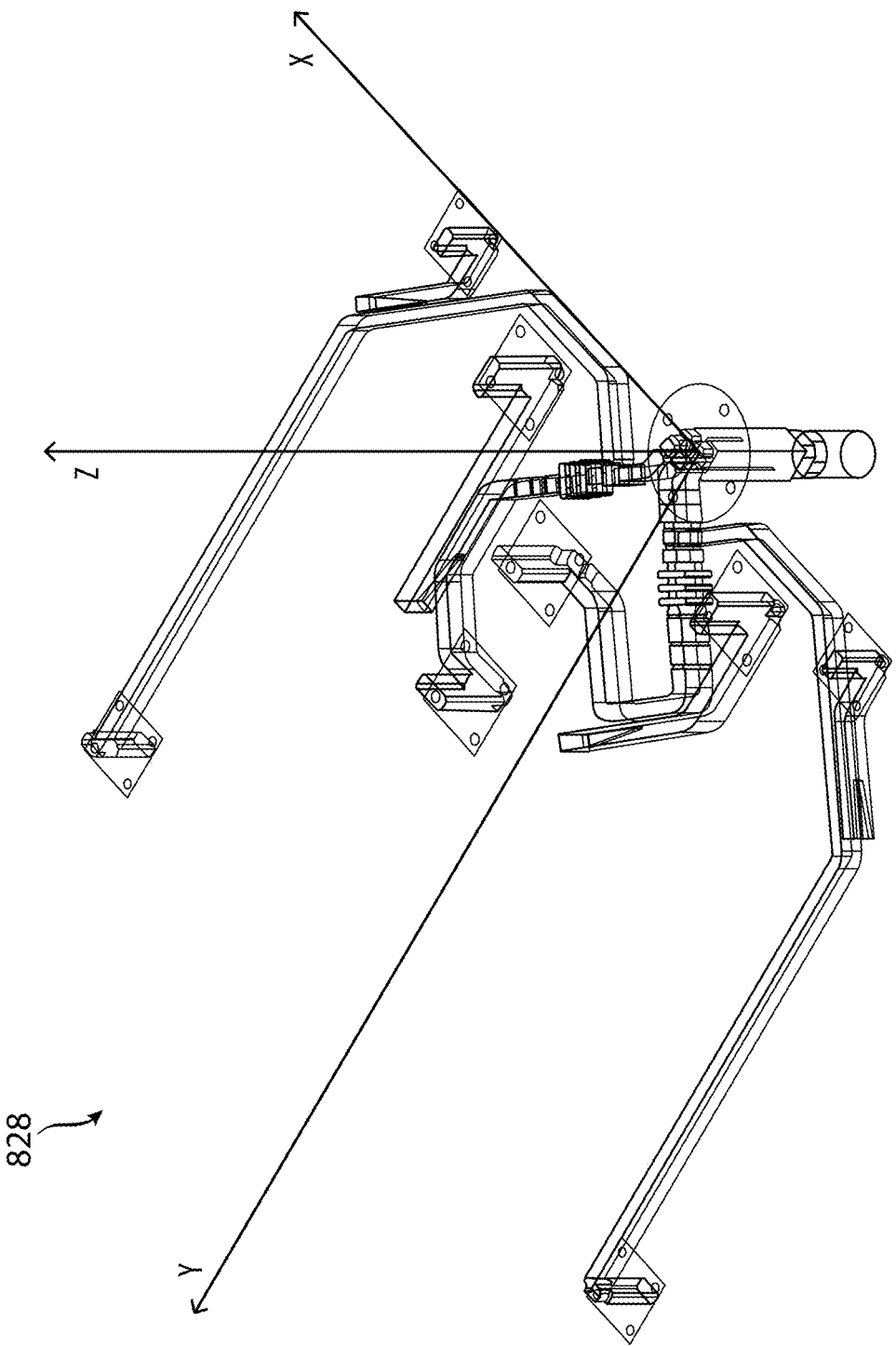
FIG. 12 is an isometric view of an interior of an alternate embodiment of the waveguide network of the integrated signal chain of FIG. 4 or 6A.

FIG. 12 depicts an alternative embodiment of a waveguide network 828, where the waveguide channels have a different configuration than that shown and described above with respect to the waveguide network 528. Accordingly, it can be appreciated that the waveguide networks described and shown herein are exemplary only, and may be modified for different signal processing applications. For instance, the waveguide networks may include some or all of the features shown and described in U.S. application Ser. No. 17/094,687, filed Nov. 10, 2020, which is hereby incorporated by reference in its entirety.

In the illustrated example shown in FIG. 11, the waveguide network 528 includes nine different ports which can be used with respective transmit, receive and polarization characteristics. For example, the common port 591 of the antenna feed 592 can be a transmit/receive port. The first receive port 614 can utilize right hand circular polarization and the second receive port 622 can utilize left hand circular polarization. The first transmit port 664 can utilize right hand circular polarization and the second transmit port 672 can utilize left hand circular polarization. The first receive test port 724 can utilize right hand circular polarization and the second receive test port 726 can utilize left hand circular polarization. The first transmit test port 754 can utilize right hand circular polarization and the second transmit test port 758 can utilize left hand circular polarization. These assignments of polarization characteristics are by way of example only and the right and left hand polarization assignments can vary.

In one aspect, the first and second WGCs 584 and 588 have waveguide sections configured to avoid any overlap with the bolt patterns used for the respective ports. For instance, the terminating portions of the first and second WGCs 584 and 588 (i.e., the waveguide sections at the end of the channel near the port) can include a compact combined E/H bend, thereby avoiding the surrounding bolt pattern of the flanged end at the port. Avoiding any such overlap can mitigate a need for bottom tapping and the requirement for tight tolerances on drill points.

Figure 13:
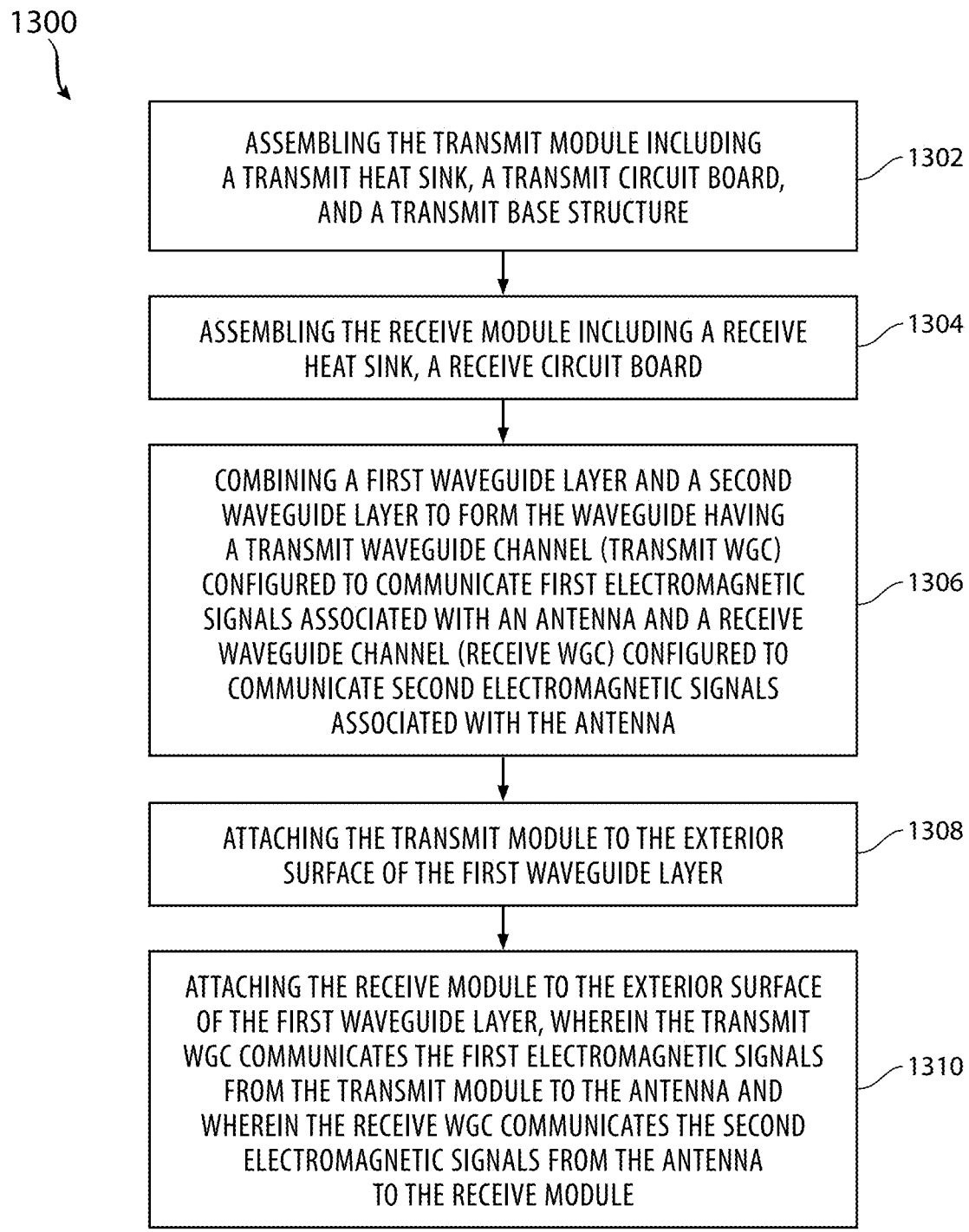
FIG. 13 is a flow diagram showing exemplary product-by-process operations for forming the integrated signal chain of FIG. 4 or 6A.

FIG. 13 illustrates a method or process embodiment 1300 for forming at least a portion of the integrated signal chain 510. In this embodiment, the system is defined in terms of the process to form or build the integrated signal chain 510. An example system can include a transmit module assembly 520, a receive module assembly 524, and a waveguide network 528, as described above with reference to FIGS. 7 and 8. The system is formed by operations including, at step 1302, assembling each transmit module 556 of the transmit module assembly 520, including securing the transmit module circuit board 560 to the transmit module base 558, securing the transmit module heatsink plate 562 to the transmit module base 558, and securing the transmit module heatsink 564 to the transmit module heatsink plate 562.

The system is further formed by operations including, at step 1304, assembling the receive module assembly 524 by securing a receive module heatsink base 572 to the receive module circuit board 570 and securing a receive module heatsink (not shown) to the receive module heatsink base 572.

At step 1306, a first waveguide layer or first planar clamshell portion 530 is combined with a second waveguide layer or second planar clamshell portion 580 to form the waveguide network 528 having first and second transmit waveguide channels (transmit WGCs) 662 and 668 configured to communicate first electromagnetic signals associated with an antenna and first and second receive waveguide channels (receive WGCs) 610 and 618 configured to communicate second electromagnetic signals associated with the antenna.

The operations can further include, at step 1308, attaching each transmit module 556 to the exterior surface 559 of the first planar clamshell portion 530. At step 1310, the process includes attaching the receive module assembly 524 to the exterior surface 559 of the first planar clamshell portion 530, wherein the transmit WGCs 662 and 668 communicate the first electromagnetic signals from the transmit module 556 to the antenna and wherein the receive WGCs 610 and 618 communicate the second electromagnetic signals from the antenna to the receive module assembly 524.

Other operations can include clamping the system once formed into test fixtures and attaching the system to a test rack. The test rack can use the test coupling ports 720, 722, 746, and 750 to sweep the error vector magnitude (EVM) for testing the performance of the system and for ensuring that the transmit modules and/or the receive module assembly work in their respective channels. These various operations can be performed by a robot, manually by a human, or a combination of robotic and manual operations.

Figure 14:
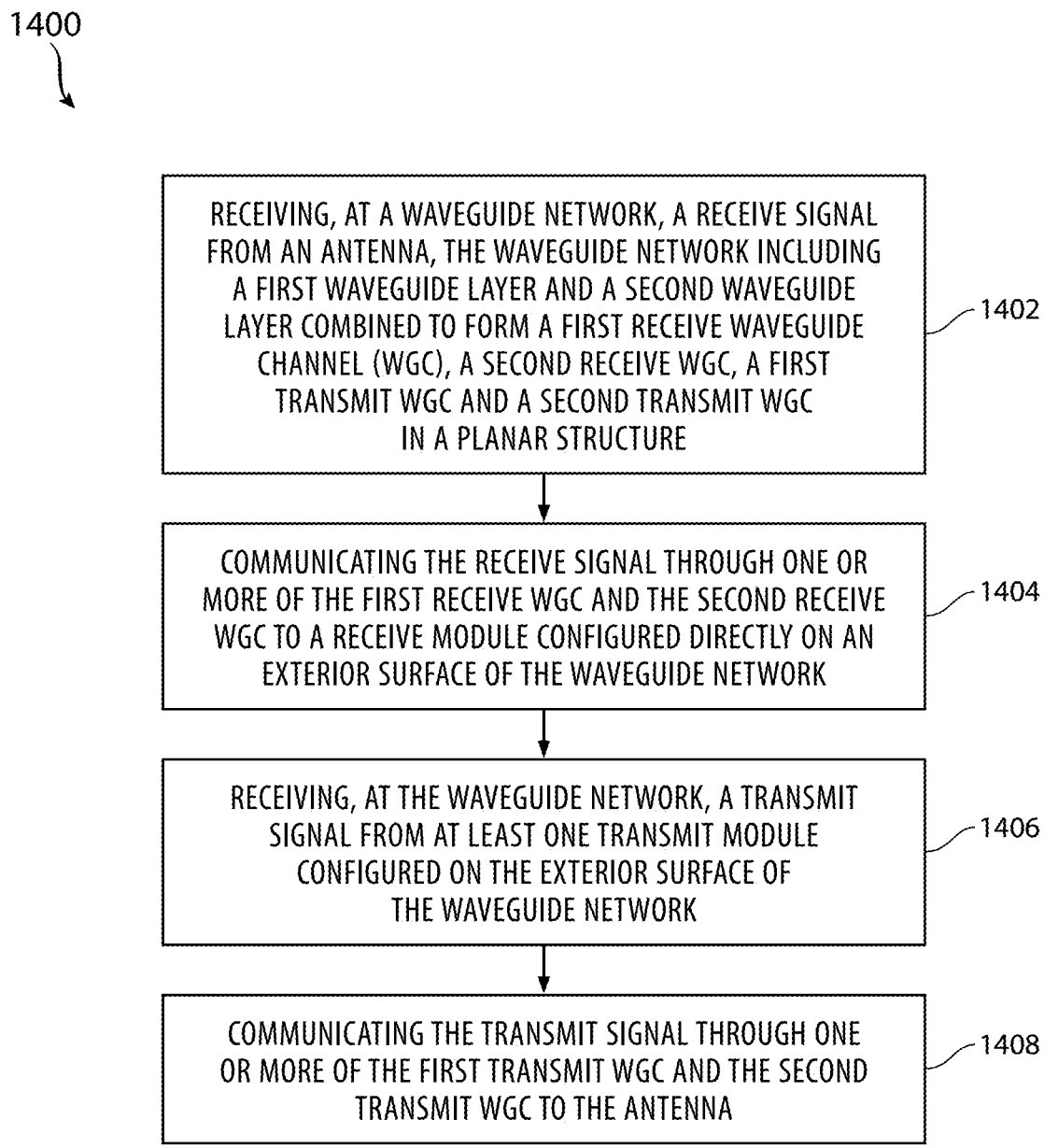
FIG. 14 is a flow diagram showing an exemplary method of operation for the integrated signal chain of FIG. 4 or 6A.

FIG. 14 illustrates an example method 1400 of using a waveguide network 528, such as the waveguide network 528. The method can include one or more of the following steps in any order. At step 1402, the method may include receiving, at a waveguide network, a receive signal from an antenna, the waveguide network including a first waveguide layer and a second waveguide layer combined to form a first receive WGC, a second receive WGC, a first transmit WGC, and a second transmit WGC. At step 1404, the method may include communicating the receive signal through one or more of the first receive WGC and the second receive WGC to a receive module assembly attached directly on an exterior surface of the waveguide network. The method can further include, at step 1406, receiving, at the waveguide network, a transmit signal from at least one transmit module configured on the exterior surface of the waveguide network. At step 1408, the method may include communicating the transmit signal through one or more of the first transmit WGC and the second transmit WGC to the antenna. These and other steps can be implemented using the structural details disclosed herein.

Figure 15:
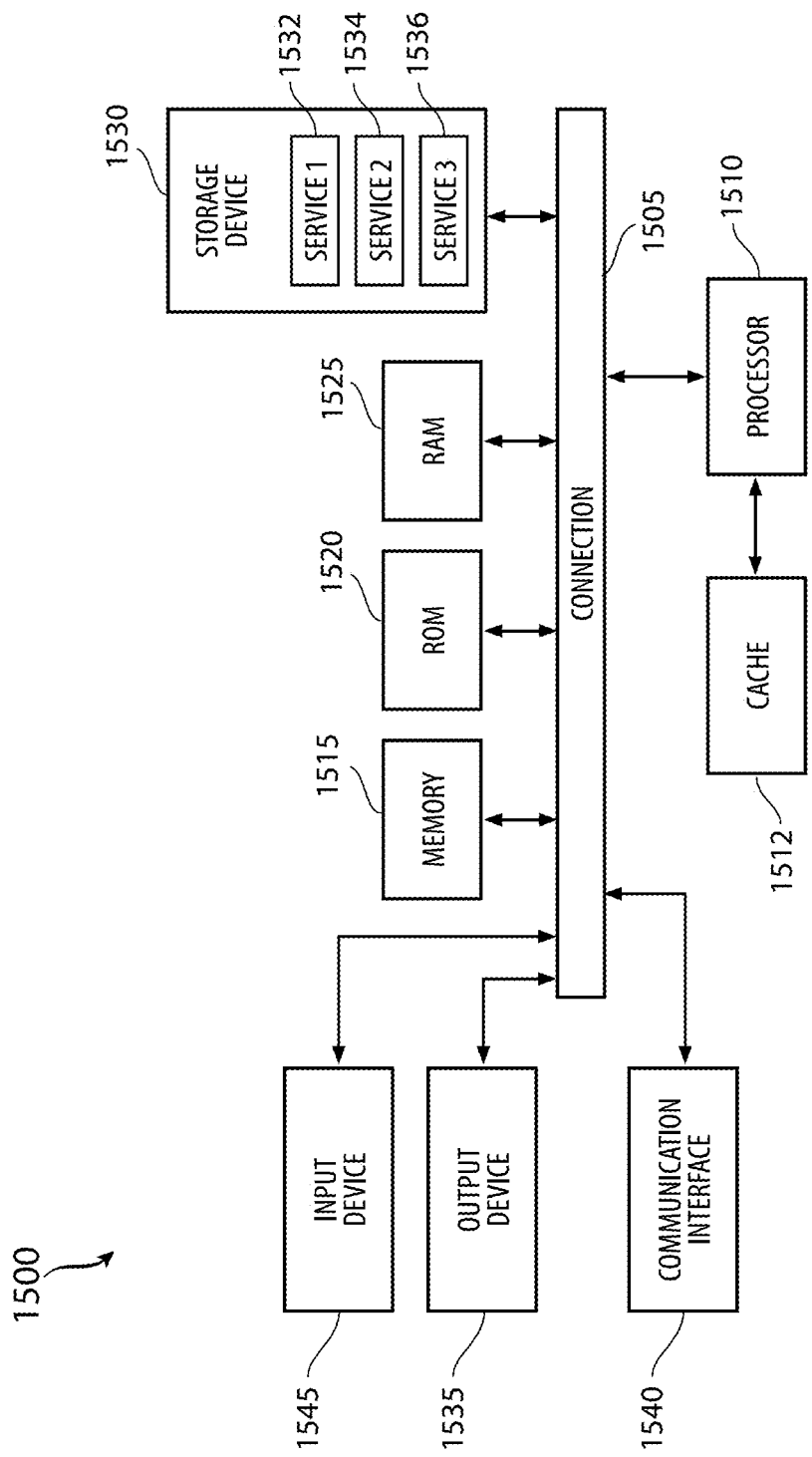
FIG. 15 illustrates a computer system that can be implemented with other aspects of the present disclosure.

FIG. 15 illustrates an example computer device that can be used in connection with any of the systems or components of the parabolic antenna disclosed herein. In this example, FIG. 15 illustrates a computing system 1500 including components in electrical communication with each other using a connection 1505, such as a bus. System 1500 includes a processing unit (CPU or processor) 1510 and a system connection 1505 that couples various system components including the system memory 1515, such as read only memory (ROM) 1520 and random access memory (RAM) 1525, to the processor 1510. The system 1500 can include a cache 1512 of high-speed memory connected directly with, in close proximity to, or integrated as part of the processor 1510. The system 1500 can copy data from the memory 1515 and/or the storage device 1530 to the cache 1512 for quick access by the processor 1510. In this way, the cache can provide a performance boost that avoids processor 1510 delays while waiting for data. These and other modules can control or be configured to control the processor 1510 to perform various actions. Other system memory 1515 may be available for use as well. The memory 1515 can include multiple different types of memory with different performance characteristics. The processor 1510 can include any general purpose processor and a hardware or software service, such as service 1-1532, service 2-1534, and service 3-1536 stored in storage device 1530, configured to control the processor 1510 as well as a special-purpose processor where software instructions are incorporated into the actual processor design. The processor 1510 may be a completely self-contained computing system, containing multiple cores or processors, a bus, memory controller, cache, etc. A multi-core processor may be symmetric or asymmetric.

To enable user interaction with the device 1500, an input device 1545 can represent any number of input mechanisms, such as a microphone for speech, a touch-sensitive screen for gesture or graphical input, keyboard, mouse, motion input, speech and so forth. An output device 1535 can also be one or more of a number of output mechanisms known to those of skill in the art. In some instances, multimodal systems can enable a user to provide multiple types of input to communicate with the device 1500. The communications interface 1540 can generally govern and manage the user input and system output. There is no restriction on operating on any particular hardware arrangement and therefore the basic features here may easily be substituted for improved hardware or firmware arrangements as they are developed.

Storage device 1530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1525, read only memory (ROM) 1520, and hybrids thereof.

The storage device 1530 can include services 1532, 1534, 1536 for controlling the processor 1510. Other hardware or software modules are contemplated. The storage device 1530 can be connected to the system connection 1505. In one aspect, a hardware module that performs a particular function can include the software component stored in a computer-readable medium in connection with the necessary hardware components, such as the processor 1510, connection 1505, output device 1535, and so forth, to carry out the function.

In some embodiments, computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. An integrated signal chain, comprising:
   a waveguide network defined by a first waveguide layer combined with a second waveguide layer forming a waveguide stack, the waveguide network including a first transmit waveguide channel (transmit WGC) configured to communicate first transmit electromagnetic signals associated with an antenna from an antenna feed port to a first transmit port, and a first receive waveguide channel (receive WGC) configured to communicate first receive electromagnetic signals associated with the antenna from a first receive port to the antenna feed port;
   a communication assembly including a transmit module attached to the exterior side of the first waveguide layer, wherein the first transmit WGC communicates transmission signals from the transmit module to the antenna, a receive module attached to the exterior side of the first waveguide layer and adjacent the transmit module, wherein the first receive WGC communicates received signals from the antenna to the receive module, and a modem adjacent the communication assembly; and
   a thermal management assembly configured for airflow in an airflow path to dissipate heat from one or more components of the communication assembly.

2. The integrated signal chain of claim 1, further comprising a plurality of transmit modules independently attached to the exterior side of the waveguide network.

3. The integrated signal chain of claim 1, further comprising a second transmit WGC, wherein the second transmit WGC is configured to communicate second transmit electromagnetic signals associated with the antenna from the antenna feed port to a second transmit port.

4. The integrated signal chain of claim 3, wherein the second transmit port is located at or near a second end of the waveguide stack.

5. The integrated signal chain of claim 1, further comprising a second receive WGC, wherein the second receive WGC is configured to communicate second receive electromagnetic signals associated with the antenna from a second receive port to the antenna feed port.

6. The integrated signal chain of claim 5, wherein the second receive port is located at or near a central region of the waveguide stack.

7. The integrated signal chain of claim 1, wherein the antenna feed is located on a first axis of the waveguide network, and wherein the first receive port of the first receive WGC is located on the first axis a spaced distance from the antenna feed.

8. The integrated signal chain of claim 1, further comprising a first test transmit WGC, wherein the first test transmit WGC is configured to communicate first test transmit electromagnetic signals associated with the antenna from the antenna feed port to a first test transmit port.

9. The integrated signal chain of claim 1, further comprising a first test receive WGC, wherein the first test receive WGC is configured to communicate first test receive electromagnetic signals associated with the antenna from the antenna feed port to a first test receive port.

10. The integrated signal chain of claim 1, wherein the thermal management assembly includes at least one fan and a shroud configured to direct air across the modem, the receive module, and the transmit module.

11. The integrated signal chain of claim 1, wherein the antenna feed port to the waveguide network is located at or near a first end of the waveguide stack, the first transmit port located at or near a second end of the waveguide stack, and the first receive port is located at or near a central region of the waveguide stack.

12. The integrated signal chain of claim 11, wherein the modem is located between the first end of the waveguide stack and the thermal management assembly.

13. The integrated signal chain of claim 1, wherein the first transmit WGC and the first receive WGC have a planar structure with an E-plane split.

14. The integrated signal chain of claim 1, wherein the a receive module is in a substantially coplanar arrangement with the transmit module and wherein the modem is in a substantially coplanar arrangement with the transmit module and the receive module.

15. The integrated signal chain of claim 1, wherein the thermal management assembly causes convection heat transfer with the modem, the receive module, and the transmit module through a common air flow system.

16. The integrated signal chain of claim 15, wherein the common air flow system includes a first fan that directs air across the modem, the receive module, and the transmit module and a second fan redundant to the first fan.

17. An integrated signal chain, comprising:
a waveguide network defined by a first waveguide layer combined with a second waveguide layer forming a waveguide stack, the waveguide network including a first transmit waveguide channel (transmit WGC) configured to communicate first transmit electromagnetic signals associated with an antenna from an antenna feed port to a first transmit port, and a first receive waveguide channel (receive WGC) configured to communicate first receive electromagnetic signals associated with the antenna from a first receive port to the antenna feed port, wherein the antenna feed port to the waveguide network is located at or near a first end of the waveguide stack, the first transmit port located at or near a second end of the waveguide stack, and the first receive port is located at or near a central region of the waveguide stack;
a transmit module attached to the exterior side of the first waveguide layer near the second end of the waveguide stack, wherein the first transmit WGC communicates transmission signals from the transmit module to the antenna;
a receive module attached to the exterior side of the first waveguide layer near the first end of the waveguide stack and adjacent the transmit module, wherein the first receive WGC communicates received signals from the antenna to the receive module;
a modem adjacent the receive module; and
a thermal management assembly configured airflow in an airflow path across the modem, the receive module, and the transmit module.

18. The integrated signal chain of claim 17, wherein the modem is located between the first end of the waveguide stack and the thermal management assembly.

19. The integrated signal chain of claim 17, wherein the thermal management assembly causes convection heat transfer with the modem, the receive module, and the transmit module through a common air flow system.

20. An integrated signal chain including a transmit module, a receive module, and a waveguide network, the integrated signal chain formed by operations comprising:
assembling the transmit module by securing a transmit heat sink to a transmit module circuit board;
assembling the receive module by securing a receive heat sink to a receive module circuit board;
combining a first waveguide layer and a second waveguide layer to form a waveguide stack defining a waveguide network including a first transmit waveguide channel (transmit WGC) configured to communicate first transmit electromagnetic signals associated with an antenna from an antenna feed port to a first transmit port, and a first receive waveguide channel (receive WGC) configured to communicate first receive electromagnetic signals associated with the antenna from a first receive port to the antenna feed port, wherein the antenna feed port to the waveguide network is located at or near a first end of the waveguide stack, the first transmit port located at or near a second end of the waveguide stack, and the first receive port is located at or near a central region of the waveguide stack;
attaching the transmit module to an exterior surface of the first waveguide layer near the second end of the waveguide stack; and
attaching the receive module to the exterior surface of the first waveguide layer near the first end of the waveguide stack, wherein the first transmit WGC communicates the first transmit electromagnetic signals from the transmit module to the antenna and wherein the first receive WGC communicates the first receive electromagnetic signals from the antenna to the receive module.

* * * * *

UNITED STATES PATENT AND TRADEMARK OFFICE
CERTIFICATE OF CORRECTION

| | |
|---|---|
| PATENT NO. | : 11,843,402 B1 |
| APPLICATION NO. | : 17/826033 |
| DATED | : December 12, 2023 |
| INVENTOR(S) | : Anders Jensen and Samuel T. Reineman |

It is certified that error appears in the above-identified patent and that said Letters Patent is hereby corrected as shown below:

In the Claims

Claim 14, Line 1 (Column 25, Line 35):
Change "wherein the a" to --wherein the--

Signed and Sealed this
Twenty-sixth Day of March, 2024

*Katherine Kelly Vidal*

Katherine Kelly Vidal
*Director of the United States Patent and Trademark Office*